(12) United States Patent
Dias et al.

(10) Patent No.: US 7,425,591 B2
(45) Date of Patent: *Sep. 16, 2008

(54) ELASTOMERIC COMPOSITION

(75) Inventors: Anthony Jay Dias, Houston, TX (US); Glenn E. Jones, Kingwood, TX (US); Donald S. Tracey, Kingwood, TX (US); Walter H. Waddell, Pasadena, TX (US)

(73) Assignee: ExxonMobil Chemical Patents Inc, Houston, TX (US)

( * ) Notice: Subject to any disclaimer, the term of this patent is extended or adjusted under 35 U.S.C. 154(b) by 71 days.

This patent is subject to a terminal disclaimer.

(21) Appl. No.: 10/398,255

(22) PCT Filed: Oct. 16, 2001

(86) PCT No.: PCT/US01/42767

§ 371 (c)(1),
(2), (4) Date: Apr. 3, 2003

(87) PCT Pub. No.: WO02/48257

PCT Pub. Date: Jun. 20, 2002

(65) Prior Publication Data

US 2004/0132894 A1 Jul. 8, 2004

(51) Int. Cl.
*C08K 9/04* (2006.01)
(52) U.S. Cl. ............... 524/445; 524/427; 524/430; 524/444; 524/447
(58) Field of Classification Search ........... 524/574, 524/490, 491, 515, 519, 567, 570, 571, 578, 524/474, 427, 430, 444, 445, 447; 152/525
See application file for complete search history.

(56) References Cited

U.S. PATENT DOCUMENTS

| | | | |
|---|---|---|---|
| 2,631,984 A | 3/1953 | Crawford et al. | |
| 3,099,644 A | 7/1963 | Parker et al. | |
| 3,813,351 A | 5/1974 | Thomson et al. | |
| 3,898,253 A | 8/1975 | Buckler et al. | |
| 3,981,342 A | 9/1976 | Farber et al. | |
| 4,057,090 A | 11/1977 | Hoshikawa et al. | |
| 4,090,546 A | 5/1978 | Honda et al. | |
| 4,210,187 A | 7/1980 | Egan | |
| 4,238,383 A | 12/1980 | Anderson | |
| 4,279,284 A * | 7/1981 | Spadone | 152/511 |
| 4,395,506 A | 7/1983 | Negano et al. | |
| 4,465,829 A | 8/1984 | Graves | |
| 4,502,520 A | 3/1985 | Sandstrom | |
| 4,616,048 A | 10/1986 | De Trano et al. | |
| 4,616,686 A | 10/1986 | Berta | |
| 4,632,963 A | 12/1986 | Gardner et al. | |
| 4,681,921 A | 7/1987 | Gardner et al. | |
| 4,703,091 A | 10/1987 | Gardner et al. | |
| 4,754,793 A | 7/1988 | Mohammed | |
| 4,840,988 A * | 6/1989 | Nakayama et al. | 524/476 |
| 4,919,183 A | 4/1990 | Dobson | |
| 4,978,714 A | 12/1990 | Bayan et al. | |
| 5,005,625 A | 4/1991 | Klemmensen et al. | |
| 5,013,793 A | 5/1991 | Wang et al. | |
| 5,040,583 A | 8/1991 | Lin et al. | |
| 5,071,913 A | 12/1991 | Powers et al. | |
| 5,120,379 A | 6/1992 | Noda et al. | |
| 5,156,921 A | 10/1992 | Lin et al. | |
| 5,162,409 A * | 11/1992 | Mroczkowski | 524/262 |
| 5,162,445 A | 11/1992 | Powers et al. | |
| 5,178,702 A | 1/1993 | Frerking, Jr. et al. | |
| 5,182,333 A | 1/1993 | Powers et al. | |
| 5,234,987 A | 8/1993 | Hubbard et al. | |
| 5,242,727 A | 9/1993 | Briddell et al. | |
| 5,286,804 A | 2/1994 | Powers et al. | |
| 5,290,886 A | 3/1994 | Ellul | |
| 5,292,590 A | 3/1994 | Lin et al. | |
| 5,397,832 A | 3/1995 | Ellul | |
| 5,491,196 A | 2/1996 | Beers et al. | |

(Continued)

FOREIGN PATENT DOCUMENTS

| | | |
|---|---|---|
| CN | 1094070 | 11/2002 |
| DE | 1242116 | 6/1967 |
| EP | 0 102 844 A2 | 3/1984 |
| EP | 0 127 998 A2 | 12/1984 |
| EP | 0 162 201 | 11/1985 |

(Continued)

OTHER PUBLICATIONS

JP Abstract for JO-3028-244-A, Publication date of Feb. 6, 1991.
Ash, Michael; *Handbook of Plastic Compounds, Elastomers, and Resins*, VCH Publishers, Inc., pp. 216-217, © 1992, New York, NY.
*Synthetic Lubricants and High-Performance Functional Fluids*, Marcel Dekker, Inc., pp. 357-392, © 1999.
Japanese Abstract—No. 25380 (Jan. 27, 1998), Y. Minagawa, et al.
U.S. Appl. No. 09/592,757, filed Jun. 13, 2000 Waddell, et al.
E. Kresge, et al.: "Butyl Rubber"; Kirk-Othmer Encycl. Of Chem. Techn.—4th Ed., vol. 8, pp. 934-955; © 1993 by John Wiley & Sons.
"Rubber Compounding"; Kirk-Othmer Encycl. Of Chem Techn.—3rd Ed., vol. 20; pp. 384-390; © 1982 John Wiley & Sons.

(Continued)

*Primary Examiner*—Peter D Mulcahy
(74) *Attorney, Agent, or Firm*—Leandro Arechederra, III; Xiaobing Feng; Nancy T Krawcyzk

(57) ABSTRACT

The present invention is a composition including an isobutylene-based copolymer and polybutene. The copolymers may be mixed with an exfoliating compound and clay, the entire composition forming a nanocomposite. The clay may or may not have an additional exfoliating treatment present prior to mixing with the interpolymer. The composition of the invention has improved air barrier properties and processing properties, and is suitable as an air barrier. One embodiment of the invention is an elastomeric composition including at least one random copolymer of at least a $C_4$ to $C_7$ isomonoolefin derived unit, at least one filler, and polybutene oil having a number average molecular weight greater than 400. The copolymer may be selected from a halogenated poly(isobutylene-co-p-methylstyrene), a halogenated star-branched butyl rubber, or a halogenated butyl rubber, and mixtures thereof.

19 Claims, No Drawings

U.S. PATENT DOCUMENTS

| | | | |
|---|---|---|---|
| 5,508,334 A | 4/1996 | Chen | |
| 5,576,372 A | 11/1996 | Kresge et al. | |
| 5,576,373 A | 11/1996 | Kresge et al. | |
| 5,580,513 A | 12/1996 | Patitsas et al. | |
| 5,594,073 A | 1/1997 | Crepeau et al. | |
| 5,621,045 A | 4/1997 | Patel et al. | |
| 5,631,316 A | 5/1997 | Costemalle et al. | |
| 5,656,694 A | 8/1997 | Frechet et al. | |
| 5,665,183 A | 9/1997 | Kresge et al. | |
| 5,670,577 A | 9/1997 | Dawson, Jr. | |
| 5,698,640 A | 12/1997 | Duvdevani et al. | |
| 5,733,621 A | 3/1998 | Cotsakis et al. | |
| 5,755,899 A | 5/1998 | Hecker et al. | |
| 5,807,629 A | 9/1998 | Elspass et al. | |
| 5,814,693 A | 9/1998 | Priest et al. | |
| 5,817,719 A | 10/1998 | Zanzig et al. | |
| 5,859,114 A | 1/1999 | Davis et al. | |
| 5,883,173 A | 3/1999 | Elspass et al. | |
| 5,922,153 A | 7/1999 | Beers et al. | |
| 5,925,702 A | 7/1999 | Hecker et al. | |
| 5,936,023 A | 8/1999 | Kato et al. | |
| 5,959,049 A | 9/1999 | Powers et al. | |
| 5,964,969 A | 10/1999 | Sandstrom | |
| 5,973,053 A | 10/1999 | Usuki et al. | |
| 6,014,998 A | 1/2000 | Mowdood et al. | |
| 6,034,164 A | 3/2000 | Elspass et al. | |
| 6,060,549 A | 5/2000 | Li et al. | |
| 6,103,817 A | 8/2000 | Usuki et al. | |
| 6,106,941 A | 8/2000 | Fisher et al. | |
| 6,207,764 B1 | 3/2001 | Ignatz-Hoover | |
| 6,228,978 B1 | 5/2001 | Agarwal et al. | |
| 6,255,389 B1 * | 7/2001 | Ouhadi et al. | 525/76 |
| 6,323,433 B1 | 11/2001 | Mahaney et al. | |
| 6,326,426 B1 | 12/2001 | Ellul | |
| 6,326,433 B1 | 12/2001 | Wang et al. | |
| 6,624,220 B1 | 9/2003 | Waddell et al. | |
| 6,710,116 B1 | 3/2004 | Waddell et al. | |
| 6,939,921 B2 | 9/2005 | Waddell et al. | |
| 2004/0030036 A1 | 2/2004 | Waddell et al. | |
| 2004/0087704 A1 | 5/2004 | Jones et al. | |
| 2004/0132894 A1 | 7/2004 | Dias et al. | |
| 2005/0027062 A1 | 2/2005 | Waddell et al. | |
| 2005/0137339 A1 | 6/2005 | Waddell et al. | |
| 2005/0222335 A1 | 10/2005 | Jones et al. | |

FOREIGN PATENT DOCUMENTS

| | | |
|---|---|---|
| EP | 0 296 332 B1 | 12/1988 |
| EP | 0 314 416 A2 | 5/1989 |
| EP | 0 320 263 B1 | 6/1989 |
| EP | 0376558 * | 4/1990 |
| EP | 0 376 558 B1 | 7/1990 |
| EP | 0 682 071 | 7/1997 |
| EP | 0 823 454 B1 | 2/1998 |
| EP | 0 930 335 A | 7/1999 |
| EP | 0 931 815 A1 | 7/1999 |
| EP | 0 992 538 | 4/2000 |
| GB | 2299337 | 10/1996 |
| JP | 48-73448 | 10/1973 |
| JP | 51-40384 | 4/1976 |
| JP | 61-218650 | 9/1986 |
| JP | 3028244 | 2/1991 |
| JP | 5179068 | 7/1993 |
| JP | 11005874 A | 1/1999 |
| JP | 2000-256493 | 9/2000 |
| JP | 05-179068 | 7/2005 |
| WO | WO 87/05310 | 9/1987 |
| WO | 01-146941 | 6/1989 |
| WO | WO 90/06859 | 6/1990 |
| WO | 04-283253 | 10/1992 |
| WO | WO 92/16587 | 10/1992 |
| WO | WO 94/01295 A | 1/1994 |
| WO | WO 94/22680 | 10/1994 |
| WO | WO 96/40801 | 12/1996 |
| WO | WO 97/14748 | 4/1997 |
| WO | WO 98/53000 | 11/1998 |
| WO | WO 99/02601 | 1/1999 |
| WO | WO 99/31178 | 6/1999 |
| WO | WO 00/69966 | 11/2000 |
| WO | WO 01/32232 | 5/2001 |
| WO | WO 02/32992 | 4/2002 |

OTHER PUBLICATIONS

*The Post Vulcanization Stabilization for NR*, W.F. Helt, B.H. To & W.W. Paris, *Rubber World*, Aug. 1991, pp. 18-23.
Formulation Design and Curing Characteristics of NBR Mixes for Seals, *Rubber World*, Sep. 1993, pp. 25-30.
U.S. Appl. No. 09/691,764, filed Oct. 18, 2000 Waddell, et al.
U.S. Appl. No. 60/294,808, filed May 31, 2001, Waddell et al., Entitled "Low Permeability Halogenated Butyl Rubber Blends".
U.S. Appl. No. 60/318,048, filed Sep. 7, 2001, Jones et al., Entitled "Elastomeric Composition".
Wagner in Rubber Technology, M. Morton Ed., Kluwer Academic Publishers (the Netherlands, 1999 reprint), pp. 86-103.

* cited by examiner

US 7,425,591 B2

ELASTOMERIC COMPOSITION

CROSS REFERENCE TO RELATED APPLICATIONS

This application claims priority to U.S. application Ser. No. 09/691,764, filed Oct. 18, 2000 and the benefit of Provisional Application No. 60/294,808, filed May 31, 2001 herein incorporated by reference in their entireties.

FIELD OF THE INVENTION

The present invention is directed towards a low-permeability elastomeric composition which may include a nanoclay, and more particularly to a composition of an isobutylene-based copolymer with a filler such as carbon black and clay with polybutene processing oil to form an air barrier such as a tire innerliner.

BACKGROUND

Bromobutyl and chlorobutyl rubbers are the polymers of choice for air-retention in tubeless tires. Similarly, brominated poly(isobutylene-co-p-methylstyrene) (BIMS), such as disclosed in U.S. Pat. Nos. 5,162,445 and 5,698,640, is typically used when heat resistance or another important property is of importance. The selection of ingredients for the commercial formulations of elastomers depends upon the balance of properties desired and the application and end use. For example, in the tire industry, processing properties of the green (uncured) compound in the tire plant versus in-service performance of the cured rubber tire composite, and the nature of the tire, i.e. bias versus radial tire, and passenger versus truck versus aircraft tire are all important considerations that must be balanced.

One method to alter product properties and improve air barrier properties is to add clays to elastomers to form a "nanocomposite". Nanocomposites are polymer systems containing inorganic particles with at least one dimension in the nanometer range. Some examples of these are disclosed in U.S. Pat. Nos. 6,060,549, 6,103,817, 6,034,164, 5,973,053, 5,936,023, 5,883,173, 5,807,629, 5,665,183, 5,576,373, and 5,576,372. A common type of inorganic particle used in nanocomposites are phyllosilicates, an inorganic substance from the general class of so called "nano-clays" or "clays". Ideally, intercalation should take place in the nanocomposite, wherein the polymer inserts into the space or gallery between the clay surfaces. Ultimately, it is desirable to have near complete exfoliation, wherein the polymer is fully dispersed with the individual nanometer-size clay platelets. Due to the general enhancement in air barrier qualities of various polymer compositions when clays are present, there is a desire to have a nanocomposite with low air permeability.

Nanocomposites have been formed using brominated copolymers of isobutylene and p-methylstyrene. See, for example, Elspass et. al., U.S. Pat. Nos. 5,807,629, 5,883,173, and 6,034,164. Further improvement in the uncured and cured properties of these elastomeric compositions can be achieved by the use of processing aids. Resins and oils (or "processing aids") such as naphthenic, paraffinic, and aliphatic resins may be used to improve the processability of elastomeric compounds. However, increased processability in the presence of oils and resins comes at the price of a loss of air impermeability and an increase in undesirable color, among other undesirable effects of various other properties.

Polybutene and paraffinic-type processing oils have been disclosed in U.S. Pat. No. 4,279,284 to Spadone, U.S. Pat. No. 5,964,969 to Sandstrom et al. and EP 0 314 416 to Mohammed. A paraffinic-type processing oil is disclosed in U.S. Pat. No. 5,631,316 to Costemalle et al. Also, WO 94/01295 to Gursky et al. discloses the use of petroleum waxes and naphthenic oils and resins in a rubber composition for tire sidewalls, and U.S. Ser. No. 09/691,764, filed Oct. 18, 2000 (assigned to the assignee of the present invention) to Waddell et al. discloses colorable rubber compositions. Other disclosures of processing oil or resin-containing elastomeric or adhesive compositions include U.S. Pat. Nos. 5,005,625, 5,013,793, 5,162,409, 5,178,702, 5,234,987, 5,234,987, 5,242,727, 5,397,832, 5,733,621, 5,755,899, EP 0 682 071 A1, EP 0376 558B1, WO 92/16587, and JP11005874, JP05179068A and J03028244. None of these disclosures solves the problem of improving processability of elastomeric compositions useful for tires, air barriers, etc., while maintaining or improving the air impermeability of those compositions.

Thus, there is still a problem of achieving a nanocomposite suitable for an air barrier, in particular, an air barrier incorporating the copolymer (or "terpolymer") of a $C_4$ to $C_7$ isomonoolefin and a p-methylstyrene and a p-halomethylstyrene, and/or a halogenated branched-butyl rubber. While enhancing the barrier properties of elastomeric compositions, nanocomposite formation tends to be at the expense of processability.

Also, it remains problematic to incorporate natural rubber into blends with these copolymers, as some desirable properties are lost upon addition of the natural rubber. What is needed is an elastomeric composition and nanocomposite composition that maintains desirable air barrier qualities, but has improved processability that processing oils and resins may provide, even in the presence of natural rubber blends.

SUMMARY OF THE INVENTION

Embodiments of the present invention include an elastomeric composition comprising at least one random copolymer comprising a $C_4$ to $C_7$ isomonoolefin derived unit, at least one filler, and polybutene oil having a number average molecular weight greater than 400, and a viscosity of greater than 35 cSt at 100° C. The copolymer is selected from poly(isobutylene-co-p-methylstyrene), halogenated poly(isobutylene-co-p-methylstyrene), halogenated star-branched butyl rubber, halogenated butyl rubber, and mixtures thereof. The composition may also include a thermoplastic resin, a filler, and/or an exfoliating clay. Suitable thermoplastic resins include polyolefins, nylons, and other polymers. The filler is selected from calcium carbonate, clay, mica, silica and silicates, talc, titanium dioxide, starch and other organic fillers such as wood flower, and carbon black, and mixtures thereof. The exfoliated clay is selected from exfoliated natural or synthetic montmorillonite, nontronite, beidellite, volkonskoite, laponite, hectorite, saponite, sauconite, magadite, kenyaite, stevensite, vermiculite, halloysite, aluminate oxides, hydrotalcite, and mixtures thereof. These compositions are useful in air barrier applications such as, for example, innerliners for a tires.

DETAILED DESCRIPTION OF THE INVENTION

The term "phr" is parts per hundred rubber, and is a measure common in the art wherein components of a composition are measured relative to a major elastomer component, based upon 100 parts by weight of the elastomer or elastomers.

As used herein, in reference to Periodic Table "Groups", the new numbering scheme for the Periodic Table Groups are used as in HAWLEY'S CONDENSED CHEMICAL DICTIONARY 852 (13th ed. 1997).

The term "elastomer", as used herein, refers to any polymer or composition of polymers consistent with the ASTM D1566 definition. The term "elastomer" may be used interchangeably with the term "rubber", as used herein.

Elastomer

Compositions of the present invention include at least one elastomer. The elastomer in one embodiment of the invention is an isobutylene-based homopolymer or copolymer. These polymers can be described as random copolymer of a $C_4$ to $C_7$ isomonoolefin derived unit, such as isobutylene derived unit, and at least one other polymerizable unit. The isobutylene-based copolymer may or may not be halogenated.

In one embodiment of the invention, the isobutylene-based elastomer is a butyl-type rubber or branched butyl-type rubber, especially halogenated versions of these elastomers. Useful elastomers are unsaturated butyl rubbers such as homopolymers and copolymers of olefins or isoolefins and multiolefins, or homopolymers of multiolefins. These and other types of elastomers suitable for the invention are well known and are described in RUBBER TECHNOLOGY 209-581 (Maurice Morton ed., Chapman & Hall 1995), THE VANDERBILT RUBBER HANDBOOK 105-122 (Robert F. Ohm ed., R. T. Vanderbilt Co., Inc. 1990), and Edward Kresge and H. C. Wang in 8 KIRK -OTHMER ENCYCLOPEDIA OF CHEMICAL TECHNOLOGY 934-955 (John Wiley & Sons, Inc. 4th ed. 1993). Non-limiting examples of unsaturated elastomers useful in the method and composition of the present invention are poly(isobutylene-co-isoprene), polyisoprene, polybutadiene, polyisobutylene, poly(styrene-co-butadiene), natural rubber, star-branched butyl rubber, and mixtures thereof. Useful elastomers in the present invention can be made by any suitable means known in the art, and the invention is not herein limited by the method of producing the elastomer.

Butyl rubbers are prepared by reacting a mixture of monomers, the mixture having at least (1) a $C_4$ to $C_{12}$ isoolefin monomer component such as isobutylene with (2) a multiolefin, monomer component. The isoolefin is in a range from 70 to 99.5 wt % by weight of the total monomer mixture in one embodiment, and 85 to 99.5 wt % in another embodiment. The multiolefin component is present in the monomer mixture from 30 to 0.5 wt % in one embodiment, and from 15 to 0.5 wt % in another embodiment. In yet another embodiment, from 8 to 0.5 wt % of the monomer mixture is multiolefin.

The isoolefin is a $C_4$ to $C_{12}$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The multiolefin is a $C_4$ to $C_{14}$ multiolefin such as isoprene, butadiene, 2,3-dimethyl-1,3-butadiene, myrcene, 6,6-dimethylfulvene, hexadiene, cyclopentadiene, and piperylene, and other monomers such as disclosed in EP 0 279 456 and U.S. Pat. Nos. 5,506,316 and 5,162,425. Other polymerizable monomers such as styrene and dichlorostyrene are also suitable for homopolymerization or copolymerization in butyl rubbers. One embodiment of the butyl rubber polymer of the invention is obtained by reacting 95 to 99.5 wt % of isobutylene with 0.5 to 8 wt % isoprene, or from 0.5 wt % to 5.0 wt % isoprene in yet another embodiment. Butyl rubbers and methods of their production are described in detail in, for example, U.S. Pat. Nos. 2,356,128, 3,968,076, 4,474,924, 4,068,051 and 5,532,312.

A commercial example of a desirable butyl rubber is EXXON™ BUTYL Grades of poly(isobutylene-co-isoprene), having a Mooney viscosity of from 32±2 to 51±5 (ML 1+8 at 125° C.). Another commercial example of a desirable butyl-type rubber is VISTANEX™ polyisobutylene rubber having a molecular weight viscosity average of from 0.9±0.15 to 2.11±0.23×10$^6$.

Another embodiment of the butyl rubber useful in the invention is a branched or "star-branched" butyl rubber. These rubbers are described in, for example, EP 0 678 529 B1, U.S. Pat. Nos. 5,182,333 and 5,071,913. In one embodiment, the star-branched butyl rubber ("SBB") is a composition of a butyl rubber, either halogenated or not, and a polydiene or block copolymer, either halogenated or not. The invention is not limited by the method of forming the SBB. The polydienes/block copolymer, or branching agents (hereinafter "polydienes"), are typically cationically reactive and are present during the polymerization of the butyl or halogenated butyl rubber, or can be blended with the butyl rubber to form the SBB. The branching agent or polydiene can be any suitable branching agent, and the invention is not limited to the type of polydiene used to make the SBB.

In one embodiment, the SBB is typically a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, ethylene-propylene diene rubber (EPDM), ethylene-propylene rubber (EPM), styrene-butadiene-styrene and styrene-isoprene-styrene block copolymers. These polydienes are present, based on the monomer wt %, greater than 0.3 wt % in one embodiment, and from 0.3 to 3 wt % in another embodiment, and from 0.4 to 2.7 wt % in yet another embodiment.

A commercial embodiment of the SBB of the present invention is SB Butyl 4266 (ExxonMobil Chemical Company, Houston Tex.), having a Mooney viscosity (ML 1+8 at 125° C., ASTM D 1646) of from 34 to 44. Further, cure characteristics of SB Butyl 4266 are as follows: MH is 69±6 dN·m, ML is 11.5±4.5 dN·m (ASTM D2084).

The isobutylene-based rubber may also be halogenated in a desirable embodiment of the isobutylene-based copolymer useful in the invention. Halogenated butyl rubber is produced by the halogenation of the butyl rubber product described above. Halogenation can be carried out by any means, and the invention is not herein limited by the halogenation process. Methods of halogenating polymers such as butyl polymers are disclosed in U.S. Pat. Nos. 2,631,984, 3,099,644, 4,554, 326, 4,681,921, 4,650,831, 4,384,072, 4,513,116 and 5,681, 901. In one embodiment, the butyl rubber is halogenated in hexane diluent at from 4 to 60° C. using bromine ($Br_2$) or chlorine ($Cl_2$) as the halogenation agent. The halogenated butyl rubber has a Mooney Viscosity of from 20 to 70 (ML 1+8 at 125° C.) in one embodiment, and from 25 to 55 in another embodiment. The halogen wt % is from 0.1 to 10 wt % based in on the weight of the halogenated butyl rubber in one embodiment, and from 0.5 to 5 wt % in another embodiment. In yet another embodiment, the halogen wt % of the halogenated butyl rubber is from 1 to 2.5 wt %.

A commercial embodiment of the halogenated butyl rubber of the present invention is Bromobutyl 2222 (ExxonMobil Chemical Company). Its Mooney Viscosity is from 27 to 37 (ML 1+8 at 125° C., ASTM 1646, modified), and the bromine content is from 1.8 to 2.2 wt % relative to the Bromobutyl 2222. Further, cure characteristics of Bromobutyl 2222 are as follows: MH is from 28 to 40 dN·m, ML is from 7 to 18 dN·m (ASTM D2084). Another commercial embodiment of the halogenated butyl rubber is Bromobutyl 2255 (ExxonMobil Chemical Company). Its Mooney Viscosity is from 41 to 51 (ML 1+8 at 125° C., ASTM D1646), and the bromine content is from 1.8 to 2.2 wt %. Further, cure characteristics of Bromobutyl 2255 are as follows: MH is from 34 to 48 dN·m, ML is from 11 to 21 dN·m (ASTM D2084).

In another embodiment of the brominated rubber component of the invention, a branched or "star-branched" halogenated butyl rubber is used. In one embodiment, the halogenated star-branched butyl rubber ("HSSB") is a composition of a butyl rubber, either halogenated or not, and a polydiene or block copolymer, either halogenated or not. The halogenation process is described in detail in U.S. Pat. Nos. 4,074,035, 5,071,913, 5,286,804, 5,182,333 and 6,228,978. The invention is not limited by the method of forming the HSSB. The polydienes/block copolymer, or branching agents (hereinafter "polydienes"), are typically cationically reactive and are present during the polymerization of the butyl or halogenated butyl rubber, or can be blended with the butyl or halogenated butyl rubber to form the HSSB. The branching agent or polydiene can be any suitable branching agent, and the invention is not limited to the type of polydiene used to make the HSSB.

In one embodiment, the HSSB is typically a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, ethylene-propylene diene rubber, styrene-butadiene-styrene and styrene-isoprene-styrene block copolymers. These polydienes are present, based on the monomer wt %, greater than 0.3 wt % in one embodiment, and from 0.3 to 3 wt % in another embodiment, and from 0.4 to 2.7 wt % in yet another embodiment.

A commercial embodiment of the HSSB of the present invention is Bromobutyl 6222 (ExxonMobil Chemical Company), having a Mooney Viscosity (ML 1+8 at 125° C., ASTM D1646) of from 27 to 37, and a bromine content of from 2.2 to 2.6 wt % relative to the HSSB. Further, cure characteristics of Bromobutyl 6222 are as follows: MH is from 24 to 38 dN·m, ML is from 6 to 16 dN·m (ASTM D2084).

Another embodiment of the isobutylene-based elastomer useful in the invention is an isoolefin copolymer comprising a halomethylstyrene derived unit. The elastomer in one embodiment of the invention is a random copolymer of comprising at least $C_4$ to $C_7$ isoolefin derived units, such as isobutylene derived units, and halomethylstyrene derived units. The halomethylstyrene unit may be an ortho-, meta-, or para-alkyl-substituted styrene unit. In one embodiment, the halomethylstyrene derived unit is a p-halomethylstyrene containing at least 80%, more preferably at least 90% by weight of the para-isomer. The "halo" group can be any halogen, desirably chlorine or bromine. The halogenated elastomer may also include functionalized interpolymers wherein at least some of the alkyl substituents groups present in the styrene monomer units contain benzylic halogen or some other functional group described further below. These interpolymers are herein referred to as "isoolefin copolymers comprising a halomethylstyrene derived unit" or simply "isoolefin copolymer".

The isoolefin copolymer may also include other monomer derived units. The isoolefin of the copolymer may be a $C_4$ to $C_{12}$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The copolymer may also further comprise multiolefin derived units. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene, and other monomers such as disclosed in EP 0 279 456 and U.S. Pat. Nos. 5,506,316 and 5,162,425. Desirable styrenic monomer derived units that may comprise the copolymer include styrene, methylstyrene, chlorostyrene, methoxystyrene, indene and indene derivatives, and combinations thereof.

In another embodiment of the invention, the interpolymer is a random elastomeric copolymer of an ethylene derived unit or a $C_3$ to $C_6$ α-olefin derived unit and an halomethylstyrene derived unit, preferably p-halomethylstyrene containing at least 80%, more preferably at least 90% by weight of the para-isomer and also include functionalized interpolymers wherein at least some of the alkyl substituents groups present in the styrene monomer units contain benzylic halogen or some other functional group.

Preferred isoolefin copolymers may be characterized as interpolymers containing the following monomer units randomly spaced along the polymer chain:

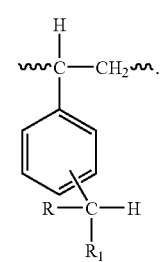

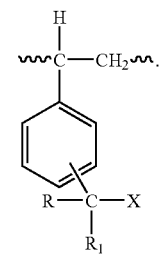

wherein R and $R^1$ are independently hydrogen, lower alkyl, preferably $C_1$ to $C_7$ alkyl and primary or secondary alkyl halides and X is a functional group such as halogen. Desirable halogens are chlorine, bromine or combinations thereof. Preferably R and $R^1$ are each hydrogen. The —$CRR_1H$ and —$CRR_1X$ groups can be substituted on the styrene ring in either the ortho, meta, or para positions, preferably para. Up to 60 mole % of the p-substituted styrene present in the interpolymer structure may be the functionalized structure (2) above in one embodiment, and in another embodiment from 0.1 to 5 mol %. In yet another embodiment, the amount of functionalized structure (2) is from 0.4 to 1 mol %.

The functional group X may be halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers, their method of preparation, methods of functionalization, and cure are more particularly disclosed in U.S. Pat. No. 5,162,445.

Most useful of such functionalized materials are elastomeric random interpolymers of isobutylene and p-methylstyrene containing from 0.5 to 20 mole % p-methylstyrene wherein up to 60 mole % of the methyl substituent groups present on the benzyl ring contain a bromine or chlorine atom, preferably a bromine atom (p-bromomethylstyrene), as well as acid or ester functionalized versions thereof wherein the halogen atom has been displaced by maleic anhydride or by acrylic or methacrylic acid functionality. These interpolymers are termed "halogenated poly(isobutylene-co-p-methylstyrene)" or "brominated poly(isobutylene-co-p-methylstyrene)", and are commercially available under the name EXXPRO™ Elastomers (ExxonMobil Chemical Company, Houston Tex.). It is understood that the use of the terms "halogenated" or "brominated" are not limited to the method of halogenation of the copolymer, but merely descriptive of the copolymer which comprises the isobutylene derived units, the p-methylstyrene derived units, and the p-halomethylstyrene derived units.

These functionalized polymers preferably have a substantially homogeneous compositional distribution such that at least 95% by weight of the polymer has a p-alkylstyrene content within 10% of the average p-alkylstyrene content of the polymer. More preferred polymers are also characterized by a narrow molecular weight distribution (Mw/Mn) of less than 5, more preferably less than 2.5, a preferred viscosity average molecular weight in the range of from 200,000 up to 2,000,000 and a preferred number average molecular weight in the range of from 25,000 to 750,000 as determined by gel permeation chromatography.

The copolymers may be prepared by a slurry polymerization of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional derived unit.

Preferred halogenated poly(isobutylene-co-p-methylstyrene) are brominated polymers which generally contain from 0.1 to 5 wt % of bromomethyl groups. In yet another embodiment, the amount of bromomethyl groups is from 0.2 to 2.5 wt %. Expressed another way, preferred copolymers contain from 0.05 up to 2.5 mole % of bromine, based on the weight of the polymer, more preferably from 0.1 to 1.25 mole % bromine, and are substantially free of ring halogen or halogen in the polymer backbone chain. In one embodiment of the invention, the interpolymer is a copolymer of $C_4$ to C, isomonoolefin derived units, a p-methylstyrene derived units and a p-halomethylstyrene derived units, wherein the p-halomethylstyrene units are present in the interpolymer from 0.4 to 1 mol % based on the interpolymer. In another embodiment, the p-halomethylstyrene is p-bromomethylstyrene. The Mooney Viscosity (1+8, 125° C., ASTM D1646, modified) is from 30 to 60 MU.

The elastomeric component present in compositions of the invention may contain various amounts of one, two, or more different elastomers. For example, embodiments of compositions of the invention may contain from 5 to 100 phr of halogenated butyl rubber, from 5 to 95 phr of star-branched butyl rubber, from 5 to 95 phr of halogenated star-branched butyl rubber, or from 5 to 95 phr of halogenated poly(isobutylene-co-p-methylstyrene). In another embodiment, the compositions contain from 40 to 100 phr of halogenated poly(isobutylene-co-p-methylstyrene), and/or from 40 to 100 phr of halogenated star-branched butyl rubber (HSSB). The elastomeric compositions of the invention may contain other elastomers, or so called "secondary" elastomer components.

Secondary Elastomeric Component

A secondary elastomeric component may be present in compositions of the present invention. These rubbers include, but are not limited to, natural rubbers, polyisoprene rubber, styrene butadiene rubber (SBR), polybutadiene rubber, isoprene butadiene rubber (IBR), styrene-isoprene-butadiene rubber (SIBR), ethylene-propylene rubber, ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; isobutylene/methylstyrene copolymers such as isobutylene/meta-bromomethylstyrene, isobutylene/bromomethylstyrene, isobutylene/chloromethylstyrene, halogenated isobutylene cyclopentadiene, and isobutylene/chloromethylstyrene and mixtures thereof.

A secondary rubber component may also be present in the composition and air barrier of the invention. An embodiment of the secondary rubber component present is natural rubber. Natural rubbers are described in detail by *Subramaniam* in RUBBER TECHNOLOGY 179-208 (1995). Desirable embodiments of the natural rubbers of the present invention are selected from the group consisting of Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

Some commercial examples of synthetic secondary rubbers useful in the present invention are NATSYN™ (Goodyear Chemical Company), and BUDENE™ 1207 or BR 1207 (Goodyear Chemical Company). A desirable rubber is high cis-polybutadiene (cis-BR). By "cis-polybutadiene" or "high cis-polybutadiene", it is meant that 1,4-cis polybutadiene is used, wherein the amount of cis component is at least 95%. An example of high cis-polybutadiene commercial products used in the composition BUDENE™ 1207. A suitable ethylene-propylene rubber is commercially available as VISTALON™ (ExxonMobil Chemical Company).

In one embodiment of the invention, a so called semi-crystalline copolymer (SCC) is present as the secondary rubber. Semi-crystalline copolymers are described in U.S. Ser. No. 09/569,363, filed on May 11, 2000 (assigned to the assignee of the present invention). Generally, the SCC is a copolymer of ethylene or propylene derived units and a-olefin derived units, the a-olefin having from 4 to 16 carbon atoms in one embodiment, and in another embodiment the SCC is a copolymer of ethylene derived units and a-olefin derived units, the α-olefin having from 4 to 10 carbon atoms, wherein the SCC has some degree of crystallinity. In a further embodiment, the SCC is a copolymer of 1-butene derived units and another α-olefin derived unit, the other α-olefin having from 5 to 16 carbon atoms, wherein the SCC also has some degree of crystallinity. The SCC can also be a copolymer of ethylene and styrene.

The secondary rubber component of the elastomer composition may be present in a range from up to 50 phr in one embodiment, from up to 40 phr in another embodiment, and from up to 30 phr in yet another embodiment.

Thermoplastic Resin

The compositions of the invention may optionally include a thermoplastic resin. Thermoplastic resins suitable for practice of the present invention may be used singly or in combination and are resins containing nitrogen, oxygen, halogen, sulfur or other groups capable of interacting with an aromatic functional groups such as halogen or acidic groups. The resins are present in the nanocomposite from 30 to 90 wt % of the nanocomposite in one embodiment, and from 40 to 80 wt % in another embodiment, and from 50 to 70 wt % in yet another embodiment. In yet another embodiment, the resin is present at a level of greater than 40 wt % of the nanocomposite, and greater than 60 wt % in another embodiment.

Suitable thermoplastic resins include resins selected from the group consisting or polyamides, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof.

Suitable thermoplastic polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of such polyamides are polycaprolactam (nylon-6), polylauryllactam (nylon-12), polyhexamethyleneadipamide (nylon-6,6) polyhexamethyleneazelamide (nylon-6,9), polyhexamethylenesebacamide (nylon-6,10), polyhexamethyleneisophthalamide (nylon-6, IP) and the condensation product of 11-amino-undecanoic acid (nylon-11). Additional examples of satisfactory polyamides (especially those having a softening point below 275° C.) are described in 16 ENCYCLOPEDIA OF CHEMICAL TECHNOLOGY 1-105 (John Wiley & Sons 1968), CONCISE ENCYCLOPEDIA OF POLYMER SCIENCE AND 748-761 (John Wiley & Sons, 1990), and 10 ENCYCLOPEDIA OF POLYMER SCIENCE AND TECHNOLOGY 392-414 (John Wiley & Sons 1969). Commercially available thermoplastic polyamides may be advantageously used in the practice of this invention, with linear crystalline polyamides having a softening point or melting point between 160 and 260° C. being preferred.

Suitable thermoplastic polyesters which may be employed include the polymer reaction products of one or a mixture of aliphatic or aromatic polycarboxylic acids esters of anhydrides and one or a mixture of diols. Examples of satisfactory polyesters include poly (trans-1,4-cyclohexylene $C_{2-6}$ alkane dicarboxylates such as poly(trans-1,4-cyclohexylene succinate) and poly (trans-1,4-cyclohexylene adipate); poly (cis or trans-1,4-cyclohexanedimethylene) alkanedicarboxylates such as poly(cis-1,4-cyclohexanedimethylene) oxlate and poly-(cis-1,4-cyclohexanedimethylene) succinate, poly ($C_{2-4}$ alkylene terephthalates) such as polyethyleneterephthalate and polytetramethylene-terephthalate, poly ($C_{2-4}$ alkylene isophthalates such as polyethyleneisophthalate and polytetramethylene-isophthalate and like materials. Preferred polyesters are derived from aromatic dicarboxylic acids such as naphthalenic or phthalic acids and $C_2$ to $C_4$ diols, such as polyethylene terephthalate and polybutylene terephthalate. Preferred polyesters will have a melting point in the range of 160° C. to 260° C.

Poly(phenylene ether) (PPE) thermoplastic resins which may be used in accordance with this invention are well known, commercially available materials produced by the oxidative coupling polymerization of alkyl substituted phenols. They are generally linear, amorphous polymers having a glass transition temperature in the range of 190° C. to 235° C. These polymers, their method of preparation and compositions with polystyrene are further described in U.S. Pat. No. 3,383,435.

Other thermoplastic resins which may be used include the polycarbonate analogs of the polyesters described above such as segmented poly (ether co-phthalates); polycaprolactone polymers; styrene resins such as copolymers of styrene with less than 50 mol % of acrylonitrile (SAN) and resinous copolymers of styrene, acrylonitrile and butadiene (ABS); sulfone polymers such as polyphenyl sulfone; copolymers and homopolymers of ethylene and $C_2$ to $C_8$ α-olefins, in one embodiment a homopolymer of propylene derived units, and in another embodiment a random copolymer or block copolymer of ethylene derived units and propylene derived units, and like thermoplastic resins as are known in the art.

Polybutene Processing Oil

Polybutene processing oil is present in the composition of the invention. In one embodiment of the invention, the polybutene processing oil is a low molecular weight (less than 15,000 Mn) homopolymer or copolymer of olefin derived units having from 3 to 8 carbon atoms in one embodiment, preferably from 4 to 6 carbon atoms in another embodiment. In yet another embodiment, the polybutene is a homopolymer or copolymer of a $C_4$ raffinate. An embodiment of such low molecular weight polymers termed "polybutene" polymers is described in, for example, SYNTHETIC LUBRICANTS AND HIGH-PERFORMANCE FUNCTIONAL FLUIDS 357-392 (Leslie R. Rudnick & Ronald L. Shubkin, ed., Marcel Dekker 1999) (hereinafter "polybutene processing oil" or "polybutene").

In one embodiment of the invention, the polybutene processing oil is a copolymer of at least isobutylene derived units, 1-butene derived units, and 2-butene derived units. In one embodiment, the polybutene is a homopolymer, copolymer, or terpolymer of the three units, wherein the isobutylene derived units are from 40 to 100 wt % of the copolymer, the 1-butene derived units are from 0 to 40 wt % of the copolymer, and the 2-butene derived units are from 0 to 40 wt % of the copolymer. In another embodiment, the polybutene is a copolymer or terpolymer of the three units, wherein the isobutylene derived units are from 40 to 99 wt % of the copolymer, the 1-butene derived units are from 2 to 40 wt % of the copolymer, and the 2-butene derived units are from 0 to 30 wt % of the copolymer. In yet another embodiment, the polybutene is a terpolymer of the three units, wherein the isobutylene derived units are from 40 to 96 wt % of the copolymer, the 1-butene derived units are from 2 to 40 wt % of the copolymer, and the 2-butene derived units are from 2 to 20 wt % of the copolymer. In yet another embodiment, the polybutene is a homopolymer or copolymer of isobutylene and 1-butene, wherein the isobutylene derived units are from 65 to 100 wt % of the homopolymer or copolymer, and the 1-butene derived units are from. 0 to 35 wt % of the copolymer.

Polybutene processing oils useful in the invention typically have a number average molecular weight (Mn) of less than 10,000 in one embodiment, less than 8000 in another embodiment, and less than 6000 in yet another embodiment. In one embodiment, the polybutene oil has a number average molecular weight of greater than 400, and greater than 700 in another embodiment, and greater than 900 in yet another embodiment. A preferred embodiment can be a combination of any lower limit with any upper limit herein. For example, in one embodiment of the polybutene of the invention, the polybutene has a number average molecular weight of from 400 to 10,000, and from 700 to 8000 in another embodiment.

Useful viscosities of the polybutene processing oil ranges from 10 to 6000 cSt (centiStokes) at 100° C. in one embodiment, and from 35 to 5000 cSt at 100° C. in another embodiment, and is greater than 35 cSt at 100° C. in yet another embodiment, and greater than 100 cSt at 100° C. in yet another embodiment.

Commercial examples of such a processing oil are the PARAPOL™ Series of processing oils (ExxonMobil Chemical Company, Houston Tex.), such as PARAPOL™ 450, 700, 950, 1300, 2400 and 2500. The commercially available PARAPOL™ Series of polybutene processing oils are synthetic liquid polybutenes, each individual formulation having a certain molecular weight, all formulations of which can be used in the composition of the invention. The molecular weights of the PARAPOL™ oils are from 420 Mn (PARAPOL™ 450) to 2700 Mn (PARAPOL™ 2500) as determined by gel permeation chromatography. The MWD of the PARAPOL™ oils range from 1.8 to 3 in one embodiment, and from 2 to 2.8 in another embodiment.

Below, Table 1 shows some of the properties of the PARAPOL™ oils useful in embodiments of the present invention, wherein the viscosity was determined as per ASTM D445-97, and the molecular weight by gel permeation chromatography.

TABLE 1

Properties of individual PARAPOL ™ Grades

| Grade | Mn | Viscosity @ 100° C., cSt |
|---|---|---|
| 450 | 420 | 10.6 |
| 700 | 700 | 78 |
| 950 | 950 | 230 |
| 1300 | 1300 | 630 |
| 2400 | 2350 | 3200 |
| 2500 | 2700 | 4400 |

Other properties of PARAPOL™ processing oils are as follows: the density (g/mL) of PARAPOL™ processing oils varies from about 0.85 (PARAPOL™ 450) to 0.91 (PARAPOL™ 2500). The bromine number (CG/G) for PARAPOL™ oils ranges from 40 for the 450 Mn processing oil, to 8 for the 2700 Mn processing oil.

The elastomeric composition of the invention may include one or more types of polybutene as a mixture, blended either prior to addition to the elastomer, or with the elastomer. The amount and identity (e.g., viscosity, Mn, etc.) of the polybutene processing oil mixture can be varied in this manner. Thus, PARAPOL™ 450 can be used when low viscosity is desired in the composition of the invention, while PARAPOL™ 2500 can be used when a higher viscosity is desired, or compositions thereof to achieve some other viscosity or molecular weight. In this manner, the physical properties of the composition can be controlled. More particularly, the phrases "polybutene processing oil", or "polybutene processing oil" include a single oil or a composition of two or more oils used to obtain any viscosity or molecular weight (or other property) desired, as specified in the ranges disclosed herein.

The polybutene processing oil or oils are present in the elastomeric composition of the invention from 1 to 60 phr in one embodiment, and from 2 to 40 phr in another embodiment, and from 4 to 35 phr in another embodiment, and from 5 to 30 phr in yet another embodiment. Preferably, the polybutene processing oil does not contain aromatic groups or unsaturation.

Filler and Clay

The elastomeric composition may have one or more filler components such as calcium carbonate, clay, mica, silica and silicates, talc, titanium dioxide, starch and other organic fillers such as wood flower, and carbon black. In one embodiment, the filler is carbon black or modified carbon black. The preferred filler is semi-reinforcing grade carbon black present at a level of from 10 to 150 phr of the composition, more preferably from 30 to 120 phr. Useful grades of carbon black as described in RUBBER TECHNOLOGY 59-85 (1995) range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires, are N330, N351, N550, N650, N660, and N762. Embodiments of the carbon black useful in, for example, innerliners or innertubes are N550, N650, N660, N762, N990, and Regal 85 (Cabot Corporation Alpharetta, Ga.) and the like.

Exfoliated clays may also be present in the composition. These clays, also referred to as "nanoclays", are well known, and their identity, methods of preparation and blending with polymers is disclosed in, for example, JP 2000109635, 2000109605, 11310643; DE 19726278; WO98/53000; U.S. Pat. Nos. 5,091,462, 4,431,755, 4,472,538, and 5,910,523. Swellable layered clay materials suitable for the purposes of this invention include natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like. These layered clays generally comprise particles containing a plurality of silicate platelets having a thickness of from 4-20 Å in one embodiment, 8-12 Å in another embodiment, bound together and contain exchangeable cations such as $Na^+$, $Ca^{+2}$, $K^+$ or $Mg^{+2}$ present at the interlayer surfaces.

The layered clay may be intercalated and exfoliated by treatment with organic molecules (swelling agents) capable of undergoing ion exchange reactions with the cations present at the interlayer surfaces of the layered silicate. Suitable swelling agents include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides. Desirable amine compounds (or the corresponding ammonium ion) are those with the structure $R_1R_2R_3N$, wherein $R_1$, $R_2$, and $R_3$ are $C_1$ to $C_{20}$ alkyls or alkenes which may be the same or different. In one embodiment, the exfoliating agent is a so called long chain tertiary amine, wherein at least $R_1$ is a $C_{14}$ to $C_{20}$ alkyl or alkene.

Another class of swelling agents include those which can be covalently bonded to the interlayer surfaces. These include polysilanes of the structure —$Si(R')_2R^2$ where R' is the same or different at each occurrence and is selected from alkyl, alkoxy or oxysilane and $R^2$ is an organic radical compatible with the matrix polymer of the composite.

Other suitable swelling agents include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734, 4,889,885 as well as WO92/02582.

In a preferred embodiment of the invention, the exfoliating additive is combined with a halogenated polymer. In one embodiment, the additive includes all primary, secondary and tertiary amines and phosphines; alkyl and aryl sulfides and thiols; and their polyfunctional versions. Desirable additives include: long-chain tertiary amines such as N,N-dimethyl-octadecylamine, N,N-dioctadecyl-methylamine, so called dihydrogenated tallowalkyl-methylamine and the like, and amine-terminated polytetrahydrofuran; long-chain thiol and thiosulfate compounds like hexamethylene sodium thiosulfate. In another embodiment of the invention, improved interpolymer impermeability is achieved by the presence of polyfunctional curatives such as hexamethylene bis(sodium thiosulfate) and hexamethylene bis(cinnamaldehyde).

The amount of clay or exfoliated clay incorporated in the nanocomposites in accordance with this invention is sufficient to develop an improvement in the mechanical properties or barrier properties of the nanocomposite, e.g tensile strength or air/oxygen permeability. Amounts generally will range from 0.5 to 15 wt % in one embodiment, and from 1 to 10 wt % in another embodiment, and from I to 5 in yet another embodiment, based on the polymer content of the nanocomposite. Expressed in parts per hundred rubber, the clay or exfoliated clay may be present from 1 to 30 phr in one embodiment, and from 3 to 20 phr in another embodiment. In one embodiment, the exfoliated clay is an alkylamine-exfoliated clay.

Curing Agents and Accelerators

The compositions produced in accordance with the present invention typically contain other components and additives customarily used in rubber mixes, such as pigments, accelerators, cross-linking and curing materials, antioxidants, antiozonants, and fillers. In one embodiment, processing aids (resins) such as naphthenic, aromatic or paraffinic extender oils may be present from 1 to 30 phr. In another embodiment, naphthenic, aliphatic, paraffinic and other aromatic resins and oils are substantially absent from the composition. By "substantially absent", it is meant that naphthenic, aliphatic, paraffinic and other aromatic resins are present, if at all, to an extent no greater than 2 phr in the composition.

Generally, polymer compositions, e.g., those used to produce tires, are crosslinked. It is known that the physical properties, performance characteristics, and durability of vulcanized rubber compounds are directly related to the number (crosslink density) and type of crosslinks formed during the vulcanization reaction. (See, e.g., Helt et al., *The Post Vulcanization Stabilization for NR*, RUBBER WORLD 18-23 (1991). Cross-linking and curing agents include sulfur, zinc oxide, and fatty acids. Peroxide cure systems may also be used. Generally, polymer compositions may be crosslinked by adding curative molecules, for example sulfur, metal oxides (i.e., zinc oxide), organometallic compounds, radical initiators, etc. followed by heating. In particular, the following are common curatives that will function in the present invention: ZnO, CaO, MgO, $Al_2O_3$, $CrO_3$, FeO, $Fe_2O_3$, and NiO. These metal oxides can be used in conjunction with the corresponding metal stearate complex (e.g., $Zn(Stearate)_2$, $Ca(Stearate)_2$, $Mg(Stearate)_2$, and $Al(Stearate)_3$), or with stearic acid, and either a sulfur compound or an alkylperoxide compound. (See also, *Formulation Design and Curing Characteristics of NBR Mixes for Seals*, RUBBER WORLD 25-30 (1993). This method may be accelerated and is often used for the vulcanization of elastomer compositions.

Accelerators include amines, guanidines, thioureas, thiazoles, thiurams, sulfenamides, sulfenimides, thiocarbamates, xanthates, and the like. Acceleration of the cure process may be accomplished by adding to the composition an amount of the accelerant. The mechanism for accelerated vulcanization of natural rubber involves complex interactions between the curative, accelerator, activators and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio) benzothiazole (MBS or MOR), compositions of 90% MOR and 10% MBTS (MOR 90), N-tertiarybutyl-2-benzothiazole sulfenamide (TBBS), and N-oxydiethylene thiocarbamyl-N-oxydiethylene sulfonamide (OTOS), zinc 2-ethyl hexanoate (ZEH), N,N'-diethyl thiourea.

In one embodiment of the invention, at least one curing agent is present from 0.2 to 15 phr, and from 0.5 to 10 phr in another embodiment. Curing agents include those components described above that facilitate or influence the cure of elastomers, such as metals, accelerators, sulfur, peroxides, and other agents common in the art, and as described above.

Processing

Mixing of the components may be carried out by combining the polymer components and the clay in the form of an intercalate in any suitable mixing device such as a Banbury™ mixer, Brabender™ mixer or preferably a mixer/extruder. Mixing is performed at temperatures in the range from up to the melting point of the elastomer and/or secondary rubber used in the composition in one embodiment, from 80° C. up to 340° C. in another embodiment, and from 120° C. to 300° C. in yet another embodiment, under conditions of shear sufficient to allow the clay intercalate to exfoliate and become uniformly dispersed within the polymer to form the nanocomposite.

In the example compositions, the mixing was performed in a BR Banbury™ internal mixer by techniques known in the art. Typically, from 70% to 100% of the elastomer or elastomers is first mixed for 20 to 90 seconds, or until the temperature reaches from 40 to 60° C. Then, ¾ of the filler, and the remaining amount of elastomer, if any, is typically added to the mixer, and mixing continues until the temperature reaches from 90 to 150° C. Next, the remaining filler is added, as well as the processing oil, and mixing continues until the temperature reaches from 140 to 190° C. The finished mixture is then finished by sheeting on an open mill and allowed to cool to from 60° C. to 100° C. when the curatives are added.

Mixing with the clays is performed by techniques known to those skilled in the art, wherein the clay is added to the polymer at the same time as the carbon black in one embodiment. The polybutene processing oil is typically added later in the mixing cycle after the carbon black and clay have achieved adequate dispersion in the elastomeric matrix.

The cured compositions of the invention can include various elastomers and fillers with the polybutene processing oil. The compositions of the invention typically include isobutylene-based elastomers such as halogenated poly(isobutylene-co-p-methylstyrene), butyl rubber, or halogenated star-branched butyl rubber (HSSB) either alone, or some combination with one another, with the polybutene processing oil being present from 5 to 30 phr in one embodiment.

In one embodiment, the composition is halogenated poly (isobutylene-co-p-methylstyrene) from 50 to 100 phr that may include natural rubber from 5 to 50 phr, and polybutene processing oil present from 5 to 30 phr, a filler such as a carbon black from 20 to 80 phr, and an exfoliating clay from 0.5 to 20 phr in one embodiment, and from 2 to 15 phr in another embodiment. The cure agents such as phenolic resins, sulfur, stearic acid, and zinc oxide, may be present from 0.1 to 5 phr.

In another embodiment, the composition may be a HSSB present from 50 to 100 phr that may include a halogenated poly(isobutylene-co-p-methylstyrene) from 5 to 95 phr in one embodiment, and from 20 to 70 phr in another embodiment, and polybutene processing oil present from 3 to 30 phr, a filler such as a carbon black from 20 to 80 phr, and an exfoliating clay from 0.5 to 20 phr in one embodiment, and from 2 to 15 phr in another embodiment. The cure agents such as phenolic resins, sulfur, stearic acid, and zinc oxide, may be present from 0.1 to 5 phr.

In yet another embodiment, the composition may be a halogenated butyl rubber present from 50 to 100 phr that may include a halogenated poly(isobutylene-co-p-methylstyrene) from 5 to 95 phr in one embodiment, and from 20 to 70 phr in another embodiment, and polybutene processing oil present from 3 to 30 phr, a filler such as a carbon black from 20 to 80 phr, and an exfoliating clay from 0.5 to 20 phr in one embodiment, and from 2 to 15 phr in another embodiment. The cure agents such as phenolic resins, sulfur, stearic acid, and zinc oxide, may be present from 0.1 to 5 phr.

The isobutylene-based elastomer useful in the invention can be blended with various other rubbers or plastics as disclosed herein, in particular thermoplastic resins such as nylons or polyolefins such as polypropylene or copolymers of polypropylene. These compositions are useful in air barriers such as bladders and innerliners, air sleeves (such as in air shocks), diaphragms, as well as other applications where high air or oxygen retention is desirable. In one embodiment, the cured composition has an air (air, oxygen or nitrogen at 65° C.) permeability of from $1.2\times10^{-8}$ to $4\times10^{-8}$ $cm^3$-$cm/cm^2$-sec-atm, and from $1.5\times10^{-8}$ to $3.5\times10^{-8}$ $cm^3$-$cm/cm^2$-sec-atm in another embodiment.

In one embodiment, an air barrier can be made by the method of combining at least one random copolymer comprising a $C_4$ to $C_7$ isomonoolefin derived unit, at least one filler, and polybutene oil having a number average molecular weight greater than 400, and at least one cure agent; and curing the combined components as described above.

Test Methods

Cure properties were measured using an ODR 2000 at the indicated temperature and 1 or 3 degree arc. Test specimens were cured at the indicated temperature, typically from 150° C. to 160° C., for a time corresponding to $T_c90$+appropriate mold lag. When possible, standard ASTM tests were used to determine the cured compound physical properties (see Table 2). Stress/strain properties (tensile strength, elongation at break, modulus values, energy to break) were measured at room temperature using an Instron 4202. Shore A hardness was measured at room temperature by using a Zwick Duromatic. The error ($2\sigma$) in measuring 100% Modulus is ±0.11 MPa units; the error ($2\sigma$) in measuring elongation is ±13 % units.

The values "MH" and "ML" used here and throughout the description refer to "maximum torque" and "minimum torque", respectively. The "MS" value is the Mooney scorch value, the "ML(1+4)" value is the Mooney viscosity value. The error ($2\sigma$) in the later measurement is ±0.65 Mooney viscosity units. The values of "Tc" are cure times in minutes, and "Ts" is scorch time" in minutes.

Molecular weight of the PARAPOL™ polybutene processing oil was determined by gel permeation chromatography, and the values of number average molecular weight (Mn) obtained have an error of ±20%. The techniques for determining the molecular weight (Mn and Mw) and molecular weight distribution (MWD) are generally described in U.S. Pat. No. 4,540,753 to Cozewith et al. and references cited therein, and in Verstrate et al., 21 MACROMOLECULES 3360 (1988). In a typical measurement, a 3-column set is operated at 30° C. The elution solvent used may be stabilized tetrahydrofuran (THF), or 1,2,4-trichlorobenzene (TCB). The columns are calibrated using polystyrene standards of precisely known molecular weights. A correlation of polystyrene retention volume obtained from the standards, to the retention volume of the polymer tested yields the polymer molecular weight. The viscosity of the PARAPOL™ polybutene processing oil (Table 1) was determined as per ASTM D445-97.

Tensile measurements were done at ambient temperature on Instron Series IX Automated Materials Testing System 6.03.08. Micro tensile specimens (dog-bone shaped) width of 0.08 inches (0.20 cm) and a length of 0.2 inches (0.5 cm) length (between two tabs) were used. The thickness of the specimens varied and was measured manually by Mitutoyo Digimatic Indicator connected to the system computer. The specimens were pulled at a crosshead speed of 20 inches/min. (51 cm/min.) and the stress/strain data was recorded. The average stress/strain value of at least three specimens is reported. The error ($2\sigma$) in tensile measurements is ±0.47 MPa units.

Adhesion was tested using a one-inch strip adhesion, wherein one inch×three inch adhesive bonds to Kraft paper are prepared. Samples are hung horizontally (in peel mode) in an air circulating oven and a 100 gram weight is suspended from the free end of the bond. The oven temperature is raised 10° F. (4.1° C.) every 15 minutes. The peel-fail temperature is the average of three readings.

The error in the fatigue-to-failure values is ±20%.

Oxygen permeability was measured using a MOCON OxTran Model 2/61 operating under the principle of dynamic measurement of oxygen transport through a thin film as published by R. A. Pasternak et al. in 8 JOURNAL OF POLYMER SCIENCE: PART A -2 467 (1970). The units of measure are cc-mil/$m^2$-day-mmHg. Generally, the method is as follows: flat film or rubber samples are clamped into diffusion cells which are purged of residual oxygen using an oxygen free carrier gas. The carrier gas is routed to a sensor until a stable zero value is established. Pure oxygen or air is then introduced into the outside of the chamber of the diffusion cells. The oxygen diffusing through the film to the inside chamber is conveyed to a sensor which measures the oxygen diffusion rate.

Air permeability was tested by the following method. Thin, vulcanized test specimens from the sample compositions were mounted in diffusion cells and conditioned in an oil bath at 65° C. The time required for air to permeate through a given specimen is recorded to determine its air permeability. Test specimens were circular plates with 12.7-cm diameter and 0.38-mm thickness. The error ($2\sigma$) in measuring air permeability is ±0.245 ($\times10^8$) units. Other test methods are described in Table 2.

EXAMPLES

Compositions 1-15 (Tables 3-5) exemplify the benefits of incorporating polybutene processing oil into blends of isobutylene copolymers comprising a halomethylstyrene moiety. Compositions 1, 6, and 11 represent copolymers of halogenated poly(isobutylene-co-p-methylstyrene) comprising various amounts of halogenation and amounts of p-methylstyrene (P.S.) (see Table 3). The compositions incorporating PARAPOL™ have improved air permeability, while improving or maintaining the processing properties such as green strength and fatigue to failure ratio values (Tables 6-8).

Compositions 16-21 (Table 9) exemplify the benefits of incorporating polybutene processing oil into blends of an isobutylene-based polymer such as HSSB with another rubber such as natural rubber, and an exfoliating clay. Composition 16 is the HSSB alone (SBB-6222, 100 phr), and Composition 17 is with natural rubber and PARAPOL™ alone (90 phr SBB, 10 phr natural rubber). Typically, halogenated rubbers such as HSSB have desirably low air permeability compared to, for example, natural rubber alone. When natural rubber is added to these compositions, it is known that the air permeability goes up, such as disclosed in *Inner Liners for High Performance Tires*, C. W. van Hellens in PROCEEDINGS OF RUBBER DIVISION, AMERICAN CHEMICAL SOCIETY (Indianapolis, Indiana, May 1984), and in *Bromobutyl and Chlorobutyl: A Comparison of Their Chemistry, Properties and Uses*, W. Hopkins, R. H. Jones, J. Walker in INTERNATIONAL RUBBER CONFERENCE PROCEEDINGS 205 (Kyoto, October 1985). However, as seen in composition 17, when the polybutene is present, the air permeability is maintained or improved, even when natural rubber is present in the composition.

The addition of exfoliating clays can further improve air permeability of these halogenated elastomeric compositions. Compositions 18-21 incorporate various amounts of an exfoliating clay. These data show that natural rubber improves the processing of the HSSB (Tables 10A and 10B). Further improvement in air permeability (lower values) are achieved upon addition of the clay and PARAPOL™. The inclusion of a naphthenic oil (CALSOL™) in composition 19 actually disadvantageously increases air permeability of the blend.

Compositions 22-23 (Table 11) exemplify the benefits of incorporating polybutene processing oil into an elastomeric blend of a natural rubber, isobutylene copolymers comprising a halomethylstyrene moiety, and an exfoliating clay. These data show that the processing properties are improved or maintained, while the air permeability is lowered upon addition of PARAPOL™.

Compositions 24-28 (Table 12) further exemplify the benefits of incorporating polybutene processing oil into an elastomeric blend of a natural rubber, isobutylene copolymers comprising a halomethylstyrene moiety, and an exfoliating clay. Again, PARAPOL™ processing oil, polybutene, improves the air barrier properties of the blends, while maintaining or improving the processing properties. For example, the fatigue to failure values of the composition improves upon addition of PARAPOL™, as does the green strength (Tables 13A and 13B). Compositions 27 and 28 represent preferred elastomeric blends having the lowest air permeability values, wherein EXXPRO™ 89-4 is present with SBB-622 and natural rubber and PARAPOL™.

Compositions 29-44 exemplify the benefits of incorporating polybutene processing oils in various blends of isobutylene-based copolymers. The compositions 29-32 are blends of brominated butyl rubber (Bromobutyl 2222) with PARAPOL™ with and without clays. These data show that the addition of PARAPOL™ to compositions with (composition 31) and without (composition 30) an exfoliating clay improve the processing properties such as the fatigue-to-failure values, while improving the air permeability values. The composition with both clay and polybutene are improved relative to the other brominated butyl rubber compositions.

Compositions 33-36 exemplify the use of EXXPRO™ elastomers having a PMS level of 5 wt % relative to the copolymer as a whole. These data show that the addition of polybutene processing oil alone (composition 34) improves the air barrier qualities of the blend, and adding an exfoliating clay alone (composition 35) improves the air barrier qualities. The addition of both the polybutene processing oil and clay (composition 36) improves the air barrier qualities. The processing properties are improved for the 5 wt % PMS EXXPRO™ blends when the polybutene and clay (alone or together) are present, as evidenced by, for example, the green strength values and the fatigue-to-failure values.

Compositions 37-40 exemplify the use of EXXPRO™ elastomers having a PMS level of 7.5 wt % relative to the copolymer as a whole. Overall, the air permeability improves upon addition of PARAPOL™ and/or an exfoliating clay. Finally, compositions 41-44 exemplify the use of EXXPRO™ elastomers having a PMS level of 12 wt % relative to the copolymer as a whole. Again, the air permeability improves upon addition of the polybutene PARAPOL™ and/or an exfoliating clay, as well as the processing properties. Also, the fatigue-to-failure values in the 12 wt % PMS copolymer are improved relative to the 7.5 wt % PMS copolymers.

The inclusion of polybutene to the bromobutyl rubber and brominated poly(isobutylene-co-p-methylstyrene) and nanoclay compositions tend to improve the air permeability, as shown by compositions 29-44 in Table 15B. In one embodiment, the air permeability (at 65° C.) ranges from $1.20 \times 10^{-8}$ to $1.90 \times 10^{-8}$ $cm^3$-$cm/cm^2$-sec-atm for these compositions, and from $1.30 \times 10^{-8}$ to $1.8 \times 10^{-8}$ $cm^3$-$cm/cm^2$-sec-atm in another embodiment.

Overall, the inclusion of polybutene process oils having a number average molecular weight from 400 to 6000 in one embodiment, and a viscosity of from 10 to 10,000 cSt at 100° C. in another embodiment, have improved green strength and improved or maintained processability, as well as improved (lowered) air permeability. For example, the inclusion of polybutene in compositions of elastomers improves (increases) the fatigue-to-failure values. In particular, the fatigue-to-failure ratios improve when polybutene is added to elastomer/nanoclay compositions.

In one embodiment of the elastomeric nanocomposite compositions, where the elastomer is bromobutyl rubber, the unaged fatigue-to-failure values are greater than 40,000 units, and greater than 50,000 in another embodiment, and greater than 60,000 in yet another embodiment. In another embodiment, where the elastomer is a brominated poly(isobutylene-co-p-methylstyrene), the fatigue-to-failure values are greater than 70,000, and greater than 80,000 in another embodiment. The increase in the fatigue-to-failure values upon incorporation of polybutene into the compositions is particularly advantageous when clays are present, as these values tend to decrease upon addition of clays to an elastomer. In another embodiment of the elastomeric compositions, the green strength is greater than 45 units, and greater than 50 units in another embodiment. These values, of course, may be further improved by changing the amounts of the various components in the compositions, or the viscosity and/or molecular weight of the polybutene.

Embodiments of the final nanocomposite of the present invention are useful as air barriers, such as used in producing innerliners, or innertubes for motor vehicle tires, or hoses for motor vehicles. In particular, the nanocomposites are useful in innerliners in articles such as truck tires, bus tires, passenger automobile, motorcycle tires, off the road tires, and the like. The improved heat aging resistance of the present innerliner composition makes it particularly suited for use in truck tires to increase the retreading capability of the tire.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 2

Test Methods

| Parameter | Units | Test |
|---|---|---|
| Mooney Viscosity (BIMS polymer) | ML 1 + 8, 125° C., MU | ASTM D 1646 (modified) |
| Mooney Viscosity (composition) | ML 1 + 4, 100° C., MU | ASTM D 1646 |
| Air permeability | $cm^3$-cm/$cm^2$-sec-atm | See text |
| Brittleness | ° C. | ASTM D 746 |
| Green Strength (100% Modulus) | PSI | ASTM D 412 |
| Mooney Viscosity (compound) | ML1 + 4, 100° C., MU | ASTM D 1646 |
| Mooney Scorch Time Oscillating Disk Rheometer (ODR) @ 160° C., ± 3° arc | $T_s5$, 125° C., minutes | ASTM D 1646 |
| ML | deciNewton.meter | |
| MH | dNewton.m | |
| $T_s2$ | minute | |

TABLE 2-continued

Test Methods

| Parameter | Units | Test |
|---|---|---|
| $T_c90$ | minute | |
| Cure rate | dN.m/minute | ASTM D 2084 |
| Physical Properties press cured Tc 90 + 2 min @ 160° C. | | |
| Hardness | Shore A | ASTM D 2240 |
| Modulus 100% | MPa | ASTM D 412 die C |
| Tensile Strength | MPa | |
| Elongation at Break | % | |
| Hot Air Aging, 72 hrs. @ 125° C. | | ASTM D 573 |
| Hardness Change | % | |
| Tensile Change | % | |
| Elongation Change | % | |
| Weight Change | % | |
| Tear Strength Die B & Die C | N/mm | ASTM D 624 |
| Fatigue to Failure | cycles | ASTM 4482 using Cam 24 (136% extension) |

TABLE 3

Components and Commercial Sources

| Component | Brief Description | Commercial Source |
|---|---|---|
| BENTON ™-34 | Dimethylditallowammonium chloride modified montmorillonite clay | Elementis Specialties (Belleville, NJ) |
| Bromobutyl 2222 | Brominated Poly(isobutylene-co-isoprene), Mooney Viscosity (1 + 8, 125° C.) of from 27-37 MU | ExxonMobil Chemical Company (Houston, TX) |
| CALSOL ™ 810 | Naphthenic Oil ASTM Type 103 | R. E. Carroll, Inc (Trenton, NJ) |
| CAPTAX ™ | 2-mercaptobenzothiazole | R. T. Vanderbilt |
| CLAYTONE ™-40 | Dimethyltallowammonium chloride modified montmorillonite clay | Southern Clay Products (Gonzalez, TX) |
| CLOISITE ™-25 | Dimethylditallowammonium chloride modified montmorillonite clay | Southern Clay Products (Gonzalez, TX) |
| ESCOREZ ™ | Aromatic modified aliphatic resin, 95° C. softening point | ExxonMobil Chemical Company (Houston, TX) |
| EXXPRO ™ 3035 | 5 wt % PMS, 0.5 mol % BrPMS, Mooney Viscosity 40-50. | ExxonMobil Chemical Company (Houston, TX) |
| EXXPRO ™ 89-4 | 5 wt % PMS, 0.75 mol % BrPMS, Mooney viscosity of 45 ± 5 MU (1 + 8, 125° C.) | ExxonMobil Chemical Company (Houston, TX) |
| EXXPRO ™ 01-4 | 7.5 wt % PMS, 0.85 mol % BrPMS, Mooney viscosity of 45 ± 5 MU (1 + 8, 125° C.) | ExxonMobil Chemical Company (Houston, TX) |
| EXXPRO ™ 96-4 | 12 wt % PMS, 0.85 mol % BrPMS, Mooney viscosity of 45 ± 5 MU (1 + 8, 125° C.) | ExxonMobil Chemical Company (Houston, TX) |
| KADOX ™ 930 | High Purity French Process Zinc Oxide | Zinc Corp. of America (Monaca, Pa) |
| Maglite-K | vulcanizer | C. P. Hall (Chicago, IL) |
| PARAPOL ™ | $C_4$ raffinate | ExxonMobil Chemical Company (Houston, TX) |
| Rosin Oil MR-1085 A | tackifier | Sovereign Chemical (Akron, OH) |
| SP-1068 | Brominated phenol-formaldehyde resin | Schenectady International (Schenectady, NY) |
| SBB | Star-branched butyl rubber 6222 | ExxonMobil Chemical Company (Houston, TX) |

TABLE 3-continued

| | | |
|---|---|---|
| Stearic acid | Cure agent | e.g., C. K. Witco Corp. (Taft, LA) |
| Sulfur | cure agent | e.g., R. E. Carroll (Trenton, NJ) |
| TMTD | tetramethylthiuram disulfide | e.g., R. T. Vanderbilt (Norwalk, CT) |
| Zinc Oxide 911, 720-C | activators | C. P. Hall (Chicago, IL) |

Components of Comparative and Example Compositions 1-5

| Component (phr) | 1 | 2 | 3 | 4 | 5 |
|---|---|---|---|---|---|
| EXXPRO ™ 89-4 (5 wt % PMS, 0.75 mol % BrPMS) | 100.00 | 100.00 | 100.00 | 100.00 | 100.00 |
| Carbon Black N660 | 60.00 | 60.00 | 60.00 | 60.00 | 60.00 |
| CALSOL ™-810 | 8.00 | — | — | — | — |
| STRUKTOL ™-40MS | 7.00 | 7.00 | 7.00 | 7.00 | 7.00 |
| SP-1068 | 2.00 | 2.00 | 2.00 | 2.00 | 2.00 |
| ESCOREZ ™-2510 | 2.00 | 2.00 | 2.00 | 2.00 | 2.00 |
| Stearic Acid | 1.00 | 1.00 | 1.00 | 1.00 | 1.00 |
| PARAPOL ™-700 | — | 8.00 | — | — | — |
| PARAPOL ™-950 | — | — | 8.00 | — | — |
| PARAPOL ™-1300 | — | — | — | 8.00 | — |
| PARAPOL ™-2400 | — | — | — | — | 8.00 |
| Zinc Oxide 911 | 1.00 | 1.00 | 1.00 | 1.00 | 1.00 |
| MBTS | 1.25 | 1.25 | 1.25 | 1.25 | 1.25 |
| Sulfur | 0.50 | 0.50 | 0.50 | 0.50 | 0.50 |

TABLE 4

Components of Comparative and Example Compositions 6-10

| Component (phr) | 6 | 7 | 8 | 9 | 10 |
|---|---|---|---|---|---|
| EXXPRO ™ 01-4 (7.5 wt % PMS, 0.85 mol % BrPMS) | 100.00 | 100.00 | 100.00 | 100.00 | 100.00 |
| Carbon Black N660 | 60.00 | 60.00 | 60.00 | 60.00 | 60.00 |
| CALSOL ™-810 | 8.00 | — | — | — | — |
| STRUKTOL ™-40 MS | 7.00 | 7.00 | 7.00 | 7.00 | 7.00 |
| SP-1068 | 2.00 | 2.00 | 2.00 | 2.00 | 2.00 |
| ESCOREZ ™-2510 | 2.00 | 2.00 | 2.00 | 2.00 | 2.00 |
| Stearic Acid | 1.00 | 1.00 | 1.00 | 1.00 | 1.00 |
| PARAPOL ™-700 | — | 8.00 | — | — | — |
| PARAPOL ™-950 | — | — | 8.00 | — | — |
| PARAPOL ™-1300 | — | — | — | 8.00 | — |
| PARAPOL ™-2400 | — | — | — | — | 8.00 |
| Zinc Oxide 911 | 1.00 | 1.00 | 1.00 | 1.00 | 1.00 |
| MBTS | 1.25 | 1.25 | 1.25 | 1.25 | 1.25 |
| Sulfur | 0.50 | 0.50 | 0.50 | 0.50 | 0.50 |

TABLE 5

Components of Comparative and Example Compositions 11-15

| Component (phr) | 11 | 12 | 13 | 14 | 15 |
|---|---|---|---|---|---|
| EXXPRO ™ 96-4 (12 wt % PMS, 0.85 mol % BrPMS) | 100.00 | 100.00 | 100.00 | 100.00 | 100.00 |
| Carbon Black N660 | 60.00 | 60.00 | 60.00 | 60.00 | 60.00 |
| CALSOL ™-810 | 8.00 | — | — | — | — |
| STRUKTOL ™-40 MS | 7.00 | 7.00 | 7.00 | 7.00 | 7.00 |
| SP-1068 | 2.00 | 2.00 | 2.00 | 2.00 | 2.00 |
| ESCOREZ ™-2510 | 2.00 | 2.00 | 2.00 | 2.00 | 2.00 |
| Stearic Acid | 1.00 | 1.00 | 1.00 | 1.00 | 1.00 |
| PARAPOL ™-700 | — | 8.00 | — | — | — |
| PARAPOL ™-950 | — | — | 8.00 | — | — |
| PARAPOL ™-1300 | — | — | — | 8.00 | — |
| PARAPOL ™-2400 | — | — | — | — | 8.00 |
| Zinc Oxide 911 | 1.00 | 1.00 | 1.00 | 1.00 | 1.00 |
| MBTS | 1.25 | 1.25 | 1.25 | 1.25 | 1.25 |
| Sulfur | 0.50 | 0.50 | 0.50 | 0.50 | 0.50 |

TABLE 6

Properties of Compositions 1-5

| Property | 1 | 2 | 3 | 4 | 5 |
|---|---|---|---|---|---|
| Mooney scorch @ 135° C., T5, min. | 20.47 | 21.85 | 21.40 | 22.22 | 22.32 |
| Mooney viscosity @ 100° C. | 69.1 | 71.8 | 71.9 | 72.4 | 72.0 |
| ODR, 3° Arc @ 160° C. | | | | | |
| MH-ML | 26.98 | 25.74 | 25.29 | 25.44 | 25.40 |
| ML | 13.17 | 14.48 | 14.51 | 14.54 | 15.15 |
| MH | 40.15 | 40.22 | 39.80 | 39.98 | 40.55 |
| Ts2, min. | 5.04 | 5.44 | 5.52 | 5.43 | 5.95 |
| Tc50, min. | 9.05 | 10.03 | 9.98 | 10.23 | 10.51 |
| Tc90, min. | 14.22 | 15.67 | 15.46 | 16.13 | 16.45 |
| Hardness, Shore A | 56 | 57 | 57 | 53 | 52 |
| Aged Hardness (72 h @ 125° C.) | 65 | 61 | 61 | 62 | 57 |
| 100% Modulus, MPa | 1.81 | 1.69 | 1.85 | 2.03 | 1.87 |
| 300% Modulus, MPa | 5.63 | 5.63 | 6.00 | 6.20 | 6.13 |
| Tensile, MPa | 9.89 | 10.33 | 10.10 | 10.85 | 10.89 |

TABLE 6-continued

Properties of Compositions 1-5

| Property | 1 | 2 | 3 | 4 | 5 |
|---|---|---|---|---|---|
| Elongation, % | 702% | 730% | 676% | 729% | 694% |
| Aged 100% Modulus, MPa | 3.06 | 2.29 | 2.54 | 2.72 | 2.68 |
| Aged 300% Modulus, MPa | 8.29 | 7.16 | 7.38 | 7.55 | 7.75 |
| Aged Tensile, MPa | 10.43 | 10.26 | 10.32 | 11.02 | 11.03 |
| Aged Elongation, % | 500% | 555% | 555% | 617% | 546% |
| Adhesion @ RT (Self-Carcass), N/mm | 31.70 | 32.18 | 31.81 | 31.22 | 31.97 |
| Adhesion @ 100 C. (Self-Carcass), N/mm | 22.16 | 21.55 | 24.96 | 29.63 | 24.11 |
| Green Strength, Modulus @ 100% PSI | 49.01 | 53.65 | 55.25 | 56.70 | 55.68 |
| Time to Decay 75% | 3.10 | 3.78 | 3.46 | 4.56 | 3.72 |
| Tear Resistance-N/mm | 40.04 | 41.93 | 40.51 | 42.31 | 40.92 |
| Aged Die-C Tear Resistance-N/mm | 39.13 | 37.82 | 35.05 | 37.48 | 38.35 |
| Fatigue to Failure | 1.50E+05 | 1.66E+05 | 1.90E+05 | 1.08E+05 | 9.79E+04 |
| Fatigue to Failure (Aged) | 2.11E+04 | 3.68E+04 | 5.56E+04 | 3.50E+04 | 7.11E+04 |
| Air Permeability-(To Air)-65° C., $cm^3$-cm/$cm^2$-sec-atm ($\times 10^8$) | 2.56 | 2.11 | 2.02 | 1.92 | 1.84 |

TABLE 7

Properties of Compositions 6-10

| Property | 6 | 7 | 8 | 9 | 10 |
|---|---|---|---|---|---|
| Mooney scorch @ 135° C., T5 | 16.97 | 18.33 | 17.93 | 18.33 | 18.75 |
| Mooney viscosity @ 100° C. | 67.0 | 68.5 | 70.4 | 69.0 | 70.1 |
| ODR, 3° Arc @ 160° C., 60 min | | | | | |
| MH-ML | 28.41 | 26.83 | 27.77 | 27.54 | 27.31 |
| ML | 13.89 | 14.40 | 15.36 | 14.81 | 12.91 |
| MH | 42.30 | 41.23 | 43.13 | 42.35 | 40.22 |
| Ts2 | 4.49 | 4.80 | 4.78 | 4.64 | 4.88 |
| Tc50 | 7.68 | 8.76 | 8.71 | 8.95 | 8.53 |
| Tc90 | 11.15 | 13.11 | 13.13 | 13.66 | 12.58 |
| Hardness, Shore A | 56 | 55 | 57 | 58 | 59 |
| Aged Hardness (72 h @ 125° C.) | 61 | 59 | 59 | 61 | 62 |
| 100% Modulus, MPa | 1.97 | 1.98 | 1.78 | 1.91 | 1.81 |
| 300% Modulus, MPa | 6.24 | 6.10 | 5.92 | 5.98 | 6.11 |
| Tensile, MPa | 10.36 | 10.68 | 10.41 | 9.60 | 10.91 |
| Elongation, % | 747% | 756% | 667% | 621% | 694% |
| Aged 100% Modulus, MPa | 3.65 | 2.77 | 2.38 | 2.66 | 2.65 |
| Aged 300% Modulus, MPa | 9.48 | 7.91 | 7.45 | 7.78 | 8.01 |
| Aged Tensile, MPa | 11.22 | 10.55 | 10.24 | 10.98 | 11.20 |
| Aged Elongation, % | 480% | 548% | 476% | 586% | 527% |
| Adhesion @ RT (Self-Carcass), N/mm | 32.11 | 32.21 | 31.34 | 30.54 | 32.85 |
| Adhesion @ 100 C. (Self-Carcass), N/mm | 25.75 | 19.45 | 25.00 | 20.08 | 24.02 |
| Green Strength, Modulus @ 100% PSI | 53.94 | 56.70 | 58.29 | 56.41 | 59.02 |
| Time to Decay 75% | 3.58 | 4.76 | 4.91 | 4.90 | 4.80 |
| Tear Resistance-N/mm | 40.87 | 39.02 | 39.06 | 38.62 | 40.97 |
| Aged Die-C Tear Resistance-N/mm | 35.51 | 37.26 | 34.79 | 35.78 | 36.83 |
| Fatigue to Failure | 1.51E+05 | 1.85E+05 | 1.09E+05 | 1.29E+05 | 1.53E+05 |
| Fatigue to Failure (Aged) | 5.29E+04 | 4.73E+04 | 4.13E+04 | 2.20E+04 | 3.03E+04 |
| Air Permeability-(To Air)-65° C., $cm^3$-cm/$cm^2$-sec-atm ($\times 10^8$) | 2.37 | 2.07 | 1.84 | 1.58 | 1.73 |

TABLE 8

Properties of Compositions 11-15

| Property | 11 | 12 | 13 | 14 | 15 |
|---|---|---|---|---|---|
| Mooney scorch @ 135° C., T5 | 19.17 | 20.48 | 20.80 | 20.87 | 20.05 |
| Mooney viscosity @ 100° C. | 66.7 | 67.8 | 69.3 | 70.2 | 69.8 |
| ODR, 3° Arc @ 160° C., 60 min | | | | | |
| MH-ML | 27.42 | 26.67 | 27.05 | 24.81 | 27.13 |
| ML | 15.03 | 12.97 | 13.57 | 13.90 | 13.94 |
| MH | 42.45 | 39.64 | 40.62 | 38.71 | 41.07 |
| Ts2 | 4.85 | 5.11 | 5.23 | 5.21 | 5.16 |
| Tc50 | 9.15 | 9.76 | 9.91 | 9.52 | 9.86 |
| Tc90 | 14.10 | 15.32 | 15.53 | 14.39 | 15.54 |
| Hardness, Shore A | 59 | 60 | 60 | 60 | 61 |

TABLE 8-continued

Properties of Compositions 11-15

| Property | 11 | 12 | 13 | 14 | 15 |
|---|---|---|---|---|---|
| Aged Hardness (72 h @ 125° C.) | 65 | 61 | 66 | 66 | 65 |
| 100% Modulus, MPa | 1.91 | 2.08 | 2.34 | 2.53 | 2.17 |
| 300% Modulus, MPa | 6.01 | 6.50 | 6.86 | 7.22 | 7.00 |
| Tensile, MPa | 10.28 | 10.59 | 10.71 | 10.51 | 11.32 |
| Elongation, % | 668% | 678% | 638% | 597% | 633% |
| Aged 100% Modulus, MPa | 3.60 | 3.33 | 3.32 | 3.55 | 3.48 |
| Aged 300% Modulus, MPa | 9.71 | 8.59 | 8.50 | 8.82 | 9.40 |
| Aged Tensile, MPa | 11.36 | 11.21 | 10.85 | 10.66 | 12.10 |
| Aged Elongation, % | 438% | 480% | 474% | 435% | 506% |
| Adhesion @ RT (Self-Carcass), N/mm | 31.54 | 31.05 | 29.82 | 28.28 | 30.79 |
| Adhesion @ 100 C. (Self-Carcass), N/mm | 24.30 | 19.34 | 18.65 | 25.14 | 21.23 |
| Green Strength, Modulus @ 100% PSI | 53.80 | 58.00 | 62.06 | 63.22 | 65.98 |
| Time to Decay 75% | 3.12 | 3.54 | 3.60 | 3.42 | 4.97 |
| Tear Resistance-N/mm | 37.66 | 41.98 | 37.40 | 37.98 | 38.48 |
| Aged Die-C Tear Resistance-N/mm | 32.93 | 35.08 | 34.17 | 33.39 | 34.43 |
| Fatigue to Failure (Unaged) | 1.12E+05 | 6.40E+04 | 9.00E+04 | 7.42E+04 | 5.62E+04 |
| Fatigue to Failure (Aged) | 1.23E+04 | 2.51E+04 | 2.03E+04 | 1.23E+04 | 2.55E+04 |
| Air Permeability-(To Air)-65° C., $cm^3$-cm/$cm^2$-sec-atm ($\times 10^8$) | 2.48 | 2.03 | 1.98 | 2.07 | 1.82 |

TABLE 9

Components of Comparative and Example Compositions 16-21

| Component (phr) | 16 | 17 | 18 | 19 | 20 | 21 |
|---|---|---|---|---|---|---|
| SBB-6222 | 100.0 | 90.0 | 80.0 | 80.0 | 80.0 | 80.0 |
| Natural Rubber | — | 10.0 | 20.0 | 20.0 | 20.0 | 20.0 |
| Carbon black N660 | 60.0 | 60.0 | 55.0 | 55.0 | 55.0 | 55.0 |
| CALSOL ™ 810 | 14.0 | — | — | 7.0 | — | — |
| Rosin Oil MR-1085 A | 4.0 | — | — | — | — | — |
| Stearic acid | 1.0 | 1.0 | 1.0 | 1.0 | 1.0 | 1.0 |
| SP-1068 | — | 4.0 | 4.0 | 4.0 | 4.0 | 4.0 |
| STRUKTOL ™-40 MS | — | 7.0 | 7.0 | — | 7.0 | 7.0 |
| PARAPOL ™-2500 | — | 7.0 | 7.00 | 7.00 | 7.00 | 7.00 |
| CLOISITE-25 | — | — | 5.00 | 5.00 | — | — |
| Bentone-34 | — | — | — | — | — | 5.00 |
| Claytone-40 | — | — | — | — | 5.00 | — |
| ZINC OXIDE 720-C | 3.00 | 3.00 | 3.00 | 3.00 | 3.00 | 3.00 |
| MBTS | 1.25 | 1.25 | 1.25 | 1.25 | 1.25 | 1.25 |
| sulfur | 0.10 | 0.10 | 0.10 | 0.10 | 0.10 | 0.10 |

TABLE 10A

Properties of Compositions 16-21

| Property | 16 | 17 | 18 | 19 | 20 | 21 |
|---|---|---|---|---|---|---|
| Mooney scorch @ 135° C., T5 | 9.02 | 12.73 | 11.72 | 10.77 | 9.43 | 10.1 |
| Mooney scorch @ 135° C., T10 | 10.35 | 15.80 | 17.43 | 15.67 | 15.57 | 15.9 |
| Mooney viscosity (1 + 4) @100° C. | 41.20 | 57.00 | 47.30 | 34.90 | 43.30 | 48.80 |
| ODR, 1° ARC, 150° C. | | | | | | |
| MH-ML | 5.37 | 6.79 | 6.15 | 6.48 | 6.35 | 6.41 |
| ML | 3.69 | 5.95 | 5.21 | 3.98 | 4.86 | 5.31 |
| MH | 9.06 | 12.74 | 11.36 | 10.46 | 11.21 | 11.72 |
| Ts2 | 4.08 | 7.22 | 10.07 | 8.89 | 9.32 | 8.22 |
| Tc50 | 4.52 | 9.17 | 14.96 | 12.17 | 13.42 | 12.04 |
| Tc90 | 8.52 | 16.14 | 25.24 | 21.82 | 24.62 | 22.29 |
| Hardness, SHORE A | 49 | 52 | 53 | 49 | 54 | 54 |
| Aged Hardness, 120 Hrs @ 100° C. | 67 | 62 | 63 | 62 | 60 | 60 |
| 100% Modulus, MPa | 1.24 | 1.06 | 1.25 | 0.94 | 1.20 | 1.39 |
| 300% Modulus, MPa | 4.11 | 2.77 | 3.53 | 2.65 | 3.05 | 4.02 |
| Tensile, MPa | 7.90 | 8.14 | 8.34 | 7.13 | 8.6 | 7.87 |
| Elongation, % | 606 | 876 | 704 | 672 | 913 | 605 |
| aged 100% Modulus, MPa | 2.79 | 2.00 | 1.81 | 1.83 | 1.78 | 1.77 |
| aged 300% Modulus, MPa | 8.81 | 5.86 | 4.97 | 6.20 | 5.11 | 4.88 |
| aged Tensile, MPa | 10.62 | 8.56 | 7.73 | 8.03 | 8.04 | 7.33 |
| aged Elongation, % | 432 | 563 | 543 | 406 | 552 | 521 |
| Fatigue to Failure (unaged) | 1,500,000 | 547,849 | 464,640 | 122,194 | 422,545 | 135,413 |
| Unaged Adhesion @ R.T.-(Self-Self) | 20.85 | 24.08 | 16.79 | 11.74 | 15.77 | 22.72 |
| Adhesion @ 100° C. (Self-Self) | 11.91 | 14.56 | 7.97 | 3.89 | 6.14 | 10.17 |
| Adhesion @ RT (Self-Carcass) | 4.59 | 17.61 | 14.41 | 8.92 | 11.25 | 14.89 |
| Adhesion @ 100° C. (Self-Carcass) | 4.44 | 2.99 | 4.03 | 4.51 | 5.16 | 7.10 |

TABLE 10B

Properties of Compositions 16-21

| Property | 16 | 17 | 18 | 19 | 20 | 21 |
|---|---|---|---|---|---|---|
| Green Strength, Modulus @ 100% PSI | 44.23 | 59.16 | 55.68 | 43.21 | 66.41 | 67.43 |
| Time to Decay 75% from strain end point min | 2.81 | 9.10 | 9.38 | 6.79 | 14.85 | 24.57 |
| Die B Tear Resistance-N/mm | 47.74 | 48.27 | 49.93 | 39.86 | 50.04 | 47.61 |
| Die C Tear Resistance-N/mm | 25.01 | 30.38 | 28.38 | 20.87 | 27.20 | 27.39 |
| Air Permeability, @ 65° C., $cm^3$-cm/$cm^2$-sec-atm ($\times 10^8$) | 3.31 | 2.49 | 2.86 | 3.57 | 2.66 | 2.78 |
| $N_2$ Permeability, @ 65° C., $cm^3$-cm/$cm^2$-sec-atm ($\times 10^8$) | 2.98 | 2.31 | 2.57 | 2.99 | 2.36 | 2.71 |
| Brittleness, ° C. | −45 | −37 | −37 | −44 | −37 | −41 |

TABLE 11

Components and Properties of Example Compositions 22-23

| | 22 | 23 |
|---|---|---|
| Component (phr) | | |
| EXXPRO ™ 3035 | 80.00 | 80.00 |
| Natural rubber | 20.00 | 20.00 |
| Carbon black N-660 | 35.00 | 35.00 |
| CLAYTONE 40 | 5.00 | 5.00 |
| CALSOL ™ 810 | 7.00 | — |
| PARAPOL ™ 2400 | — | 7.00 |
| Rosin oil | 4.00 | 4.00 |
| Stearic acid | 1.00 | 1.00 |
| KADOX ™ 911 | 1.00 | 1.00 |
| MBTS | 1.25 | 1.25 |
| sulfur | 0.50 | 0.50 |
| Property | | |
| Mooney scorch @ 135 C., T5, min. | 10.30 | 10.65 |
| Mooney scorch @ 135 C., T10, min. | 11.30 | 11.67 |
| Mooney scorch @ 100° C. | 44.70 | 49.70 |
| ODR @ 150° C., 1 degree arc | | |
| MH-ML | 6.60 | 6.18 |
| ML | 6.15 | 6.74 |
| MH | 12.75 | 12.92 |
| Ts2, min. | 5.96 | 6.67 |
| Tc50, min. | 7.87 | 8.51 |
| Tc90, min. | 17.46 | 18.34 |
| Hardness, Shore A | 38.50 | 39.10 |
| 100% Modulus, MPa | 1.12 | 1.12 |
| 200% Modulus, MPa | 1.55 | 1.58 |
| 300% Modulus, MPa | 2.01 | 2.16 |
| Tensile, MPa | 3.90 | 4.66 |
| Elongation, % | 778.00 | 824.00 |
| Green Strength, 100% Modulus-PSI | 48.87 | 53.07 |
| Time to Decay 75% | 5.53 | 7.88 |
| Air Permeability, @ 65° C., $cm^3$-cm/$cm^2$-sec-atm ($\times 10^8$) | 4.54 | 3.67 |

TABLE 12

Components of Example Compositions 24-28

| Components (phr) | 24 | 25 | 26 | 27 | 28 |
|---|---|---|---|---|---|
| SBB-6222 | 100.0 | 80.0 | 60.0 | 40.0 | 20.0 |
| EXXPRO ™-89-4 | — | — | 20.00 | 40.00 | 60.00 |
| Natural Rubber | — | 20.0 | 20.0 | 20.0 | 20.0 |
| Carbon black-N-660 | 60.0 | 50.0 | 55.0 | 55.0 | 55.0 |
| CLOISITE-25 | — | 10.00 | 5.00 | 5.00 | 5.00 |
| CALSOL ™-810 | 14.0 | — | — | — | — |
| Rosin Oil MR-1085 A | 4.0 | — | — | — | — |
| Stearic acid | 1.0 | 1.0 | 1.0 | 1.0 | 1.0 |
| SP-1068 | — | 4.0 | 4.0 | 4.0 | 4.0 |
| STRUKTOL ™-40 MS | — | 7.0 | 7.0 | 7.0 | 7.0 |
| PARAPOL ™-2500 | — | 7.00 | 7.00 | 7.00 | 7.00 |
| ZINC OXIDE 720-C | 3.00 | 3.00 | 3.00 | 3.00 | 3.00 |
| MBTS | 1.25 | 1.25 | 1.25 | 1.25 | 1.25 |
| sulfur | 0.10 | 0.10 | 0.10 | 0.10 | 0.10 |

TABLE 13A

Properties of Example Compositions 24-28

| Property | 24 | 25 | 26 | 27 | 28 |
|---|---|---|---|---|---|
| Mooney scorch @ 135° C., T5, min. | 9.02 | 11.42 | 5.55 | 3.68 | 1.82 |
| Mooney scorch @ 135° C., T10, min. | 10.35 | 16.73 | 8.55 | 4.72 | 2.53 |
| Mooney scorch @ 100° C. | 41.20 | 43.8 | 53.7 | 65.5 | 90.4 |
| ODR, ARC 1°, 150° C. | | | | | |
| MH-ML | 5.37 | 6.20 | 7.81 | 8.81 | 8.05 |
| ML | 3.69 | 5.23 | 6.38 | 7.85 | 9.69 |
| MH | 9.06 | 11.43 | 14.19 | 16.66 | 17.74 |
| Ts-2 | 4.08 | 11.02 | 9.47 | 8.08 | 8.18 |
| Tc-50 | 4.52 | 15.12 | 14.58 | 14.58 | 14.67 |
| Tc-90 | 8.52 | 26.25 | 25.13 | 25.23 | 25.71 |
| Hardness, Shore A | 49 | 57 | 58 | 59 | 60 |
| Aged Hardness, 120 hr @ 100° C. | 67 | 63 | 63 | 60 | 63 |
| 100% Modulus, MPa | 1.24 | 1.28 | 1.49 | 2.17 | 2.47 |
| 300% Modulus, MPa | 4.11 | 3.12 | 4.56 | 6.28 | 6.77 |
| Tensile, MPa | 7.90 | 6.99 | 9.33 | 10.29 | 9.15 |
| Elongation, % | 606 | 660 | 658 | 598 | 521 |
| Aged 100% Modulus, MPa | 2.79 | 1.87 | 2.12 | 2.74 | 2.89 |
| Aged 300% Modulus, MPa | 8.81 | 4.87 | 5.72 | 7.3 | 8.35 |
| Aged Tensile, MPa | 10.62 | 6.58 | 8.04 | 9.22 | 9.7 |
| Aged Elongation, % | 432 | 486 | 549 | 479 | 402 |
| Fatigue-to-failure (unaged) | 1,500,000 | 197,910 | 92,870 | 48,943 | 2,221 |
| Adhesion @ RT (Self-Self), N/mm | 20.85 | 13.34 | 20.45 | 23.91 | 23.8 |
| Adhesion @ 100° C. (Self-Self), N/mm | 11.91 | 4.13 | 7 | 8.42 | 7.45 |
| Adhesion @ RT (Self-Carcass), N/mm | 4.59 | 10.02 | 11.9 | 11.25 | 9.74 |
| Adhesion @ 100° C. (Self-Carcass), N/mm | 4.44 | 3.12 | 4.74 | 1.15 | 0.78 |

TABLE 13B

Properties of Example Compositions 24-28

| Property | 24 | 25 | 26 | 27 | 28 |
|---|---|---|---|---|---|
| Green Strength, Modulus @ 100% PSI | 44.23 | 62.93 | 70.18 | 94.83 | 119.19 |
| Time to Decay 75% from strain end point min. | 2.81 | 11.91 | 46.92 | — | — |
| Die B Tear Resistance-N/mm | 47.74 | 41.46 | 58.02 | 60.12 | 63.12 |
| Die C Tear Resistance-N/mm | 25.01 | 22.79 | 30.41 | 37.58 | 33.94 |

TABLE 13B-continued

Properties of Example Compositions 24-28

| Property | 24 | 25 | 26 | 27 | 28 |
|---|---|---|---|---|---|
| Air Permeability, @ 65° C., $cm^3$-cm/$cm^2$-sec-atm ($\times 10^8$) | 3.29 | 2.63 | 2.70 | 2.79 | 2.75 |
| $N_2$ Permeability, @ 65° C., $cm^3$-cm/$cm^2$-sec-atm ($\times 10^8$) | 2.97 | 2.96 | 2.74 | 1.86 | 2.19 |
| Brittleness, ° C. | −45 | −42 | −42 | −42 | −41 |

TABLE 14

Components of Example Compositions 29-44

| Component | 29 | 30 | 31 | 32 | 33 | 34 | 35 | 36 |
|---|---|---|---|---|---|---|---|---|
| Bromobutyl-2222 | 100.00 | 100.00 | 100.00 | 100.00 | — | — | — | — |
| EXXPRO ™ 89-4 | — | — | — | — | 100.00 | 100.00 | 100.00 | 100.00 |
| EXXPRO ™ 01-4 | — | — | — | — | — | — | — | — |
| EXXPRO ™ 96-4 | — | — | — | — | — | — | — | — |
| Carbon black-N-660 | 60.00 | 60.00 | 60.00 | 60.00 | 60.00 | 60.00 | 60.00 | 60.00 |
| CALSOL ™-810 | 8.00 | — | 8.00 | — | 8.00 | — | 8.00 | — |
| STRUCKTOL ™-40 MS | 7.00 | 7.00 | 7.00 | 7.00 | 7.00 | 7.00 | 7.00 | 7.00 |
| SP-1068 | 4.00 | 4.00 | 4.00 | 4.00 | 4.00 | 4.00 | 4.00 | 4.00 |
| Stearic Acid | 1.00 | 1.00 | 1.00 | 1.00 | 1.00 | 1.00 | 1.00 | 1.00 |
| PARAPOL ™-1300 | — | 8.00 | — | 8.00 | — | 8.00 | — | 8.00 |
| Maglite-K | 0.15 | 0.15 | 0.15 | 0.15 | — | — | 0.15 | 0.15 |
| CLOISITE-25A | — | — | 4.00 | 4.00 | — | — | 4.00 | 4.00 |
| ZINC OXIDE-911 | 1.00 | 1.00 | 1.00 | 1.00 | 1.00 | 1.00 | 1.00 | 1.00 |
| MBTS | 1.25 | 1.25 | 1.25 | 1.25 | 1.25 | 1.25 | 1.25 | 1.25 |
| sulfur | 0.50 | 0.50 | 0.50 | 0.50 | 0.50 | 0.50 | 0.50 | 0.50 |

| Component | 37 | 38 | 39 | 40 | 41 | 42 | 43 | 44 |
|---|---|---|---|---|---|---|---|---|
| Bromobutyl-2222 | — | — | — | — | — | — | — | — |
| EXXPRO ™ 89-4 | — | — | — | — | — | — | — | — |
| EXXPRO ™ 01-4 | 100.00 | 100.00 | 100.00 | 100.00 | — | — | — | — |
| EXXPRO ™ 96-4 | — | — | — | — | 100.00 | 100.00 | 100.00 | 100.00 |
| Carbon black-N-660 | 60.00 | 60.00 | 60.00 | 60.00 | 60.00 | 60.00 | 60.00 | 60.00 |
| CALSOL ™-810 | 8.00 | — | 8.00 | — | — | 8.00 | — | 8.00 |
| STRUCKTOL ™-40 MS | 7.00 | 7.00 | 7.00 | 7.00 | 7.00 | 7.00 | 7.00 | 7.00 |
| SP-1068 | 4.00 | 4.00 | 4.00 | 4.00 | 4.00 | 4.00 | 4.00 | 4.00 |
| Stearic Acid | 1.00 | 1.00 | 1.00 | 1.00 | 1.00 | 1.00 | 1.00 | 1.00 |
| PARAPOL ™-1300 | — | 8.00 | — | 8.00 | 8.00 | — | 8.00 | — |
| Maglite-K | — | — | 0.15 | 0.15 | — | 0.15 | 0.15 | — |
| CLOISITE-25A | — | — | 4.00 | 4.00 | — | 4.00 | 4.00 | — |
| ZINC OXIDE-911 | 1.00 | 1.00 | 1.00 | 1.00 | 1.00 | 1.00 | 1.00 | 1.00 |
| MBTS | 1.25 | 1.25 | 1.25 | 1.25 | 1.25 | 1.25 | 1.25 | 1.25 |
| sulfur | 0.50 | 0.50 | 0.50 | 0.50 | 0.50 | 0.50 | 0.50 | 0.50 |

TABLE 15A

Properties of Compositions 29-44

| Property | 29 | 30 | 31 | 32 | 33 | 34 | 35 | 36 | 37 |
|---|---|---|---|---|---|---|---|---|---|
| Mooney scorch @ 135° C., T5 | 17.30 | 18.45 | 15.42 | 15.73 | 15.23 | 16.73 | 2.72 | 1.27 | 16.33 |
| Mooney scorch @ 135° C., T10 | 20.10 | 21.52 | 19.13 | 19.18 | 18.23 | 19.77 | 3.22 | 1.83 | 19.42 |
| Mooney viscosity (1 + 4) @ 100° C. | 59.3 | 63.0 | 58.3 | 61.4 | 68.8 | 72.1 | 81.4 | 109.9 | 68.3 |
| ODR, 3° ARC, 160° C. | | | | | | | | | |
| MH-ML | 24.63 | 23.99 | 27.97 | 25.54 | 27.91 | 25.85 | 32.58 | 29.46 | 30.12 |
| ML | 9.76 | 10.52 | 9.88 | 10.89 | 12.87 | 14.76 | 17.84 | 21.29 | 11.40 |

TABLE 15A-continued

Properties of Compositions 29-44

| | | | | | | | | | |
|---|---|---|---|---|---|---|---|---|---|
| MH | 34.39 | 34.51 | 37.85 | 36.43 | 40.78 | 40.61 | 50.42 | 50.75 | 41.52 |
| Ts2 | 2.00 | 2.00 | 4.32 | 4.41 | 4.27 | 4.68 | 4.75 | 4.46 | 3.63 |
| Tc50 | 9.56 | 10.06 | 11.96 | 11.99 | 8.38 | 8.48 | 14.72 | 14.84 | 7.63 |
| Tc90 | 20.72 | 19.35 | 21.60 | 20.82 | 13.03 | 12.76 | 29.32 | 30.62 | 11.70 |
| Hardness, Shore A | 46 | 49 | 52 | 52 | 51 | 53 | 56 | 56 | 57 |
| Aged Hardness, 72 Hrs @ 125° C. | 61 | 59 | 65 | 61 | 64 | 62 | 64 | 59 | 68 |
| 100% Modulus, MPa | 1.17 | 1.28 | 1.53 | 1.57 | 1.85 | 1.89 | 3.07 | 3.39 | 2.00 |
| 300% Modulus, MPa | 4.32 | 4.27 | 5.22 | 5.38 | 6.07 | 6.06 | 9.15 | 10.15 | 6.03 |
| Tensile, MPa | 10.45 | 10.49 | 10.22 | 10.85 | 10.14 | 10.73 | 11.77 | 12.04 | 9.97 |
| Elongation, % | 712 | 757 | 644 | 662 | 651 | 738 | 469 | 398 | 675 |
| Aged 100% Modulus, MPa | 2.27 | 1.97 | 2.82 | 2.16 | 3.25 | 2.71 | 4.31 | 3.94 | 3.73 |
| Aged 300% Modulus, MPa | 6.72 | 5.87 | 7.18 | 6.21 | 9.61 | 7.79 | 11.68 | 11.42 | 9.63 |
| Aged Tensile, MPa | 8.66 | 8.45 | 8.53 | 8.03 | 11.19 | 11.23 | 12.58 | 13.77 | 10.97 |
| Aged Elongation, % | 480 | 572 | 443 | 523 | 462 | 566 | 374 | 418 | 455 |
| Fatigue to Failure (Unaged) | 31,437 | 56,984 | 24,986 | 53,965 | 106,159 | 85,362 | 17,298 | 12,471 | 80,001 |
| Fatigue to Failure (Aged) | 6,934 | 20,197 | 13,702 | 26,046 | 14,698 | 16,317 | 6,538 | 8,011 | 12,878 |
| Unaged Adhesion @ RT (Self-Carcass), N/mm | 32.79 | 31.98 | 19.72 | 23.62 | 30.57 | 29.11 | 23.54 | 25.00 | 29.86 |
| Unaged Adhesion @ 100° C. (Self-Carcass), N/mm | 19.10 | 18.33 | 8.66 | 10.55 | 17.98 | 17.77 | 10.30 | 10.72 | 19.25 |

| Property | 38 | 39 | 40 | 41 | 42 | 43 | 44 |
|---|---|---|---|---|---|---|---|
| Mooney scorch @ 135° C., T5 | 16.72 | 5.12 | 3.78 | 16.17 | 17.48 | 4.05 | 16.55 |
| Mooney scorch @ 135° C., T10 | 19.55 | 6.27 | 4.53 | 19.38 | 20.78 | 4.88 | 19.35 |
| Mooney viscosity (1 + 4) @ 100° C. | 71.0 | 70.6 | 77.7 | 67.9 | 70.6 | 71.6 | 67.2 |
| ODR, 3° ARC, 160° C. | | | | | | | |
| MH-ML | 27.90 | 31.88 | 30.20 | 29.05 | 27.63 | 24.91 | 27.98 |
| ML | 13.36 | 13.54 | 16.72 | 12.12 | 13.85 | 14.05 | 12.72 |
| MH | 41.26 | 45.42 | 46.92 | 41.17 | 41.48 | 38.96 | 40.70 |
| Ts2 | 4.10 | 4.24 | 4.79 | 4.15 | 4.36 | 4.20 | 4.21 |
| Tc50 | 7.89 | 14.22 | 15.17 | 8.03 | 8.95 | 18.01 | 7.97 |
| Tc90 | 11.92 | 29.10 | 31.18 | 12.48 | 14.39 | 45.37 | 12.86 |
| Hardness, Shore A | 56 | 57 | 60 | 56 | 56 | 59 | 52 |
| Aged Hardness, 72 Hrs @ 125° C. | 63 | 68 | 63 | 67 | 64 | 65 | 65 |
| 100% Modulus, MPa | 1.80 | 2.39 | 2.65 | 2.00 | 2.04 | 2.34 | 1.62 |
| 300% Modulus, MPa | 5.94 | 7.09 | 8.06 | 5.95 | 6.27 | 7.18 | 5.70 |
| Tensile, MPa | 10.88 | 10.99 | 12.05 | 10.00 | 10.67 | 12.52 | 10.00 |
| Elongation, % | 707 | 619 | 598 | 676 | 675 | 659 | 701 |
| Aged 100% Modulus, MPa | 2.58 | 4.21 | 3.56 | 3.8 | 2.89 | 3.92 | 2.95 |
| Aged 300% Modulus, MPa | 7.91 | 10.32 | 9.72 | 9.92 | 8.2 | 10.13 | 8.84 |
| Aged Tensile, MPa | 10.82 | 11.49 | 12.13 | 11.02 | 10.83 | 12.37 | 10.89 |
| Aged Elongation, % | 520 | 428 | 479 | 408 | 514 | 462 | 467 |
| Fatigue to Failure (Unaged) | 123,851 | 107,148 | 74,309 | 104,171 | 59,696 | 102,587 | 181,028 |
| Fatigue to Failure (Aged) | 44,506 | 21,898 | 22,871 | 9,982 | 12,792 | 41,154 | 12,295 |
| Unaged Adhesion @ RT (Self-Carcass), N/mm | 27.68 | 24.32 | 24.46 | 25.86 | 23.89 | 17.14 | 29.14 |
| Unaged Adhesion @ 100° C. (Self-Carcass), N/mm | 17.17 | 9.56 | 12.25 | 14.77 | 14.46 | 7.59 | 16.30 |

TABLE 15B

Properties of Compositions 29-44

| Property | 29 | 30 | 31 | 32 | 33 | 34 | 35 | 36 | 37 | 38 | 39 | 40 | 41 | 42 | 43 | 44 |
|---|---|---|---|---|---|---|---|---|---|---|---|---|---|---|---|---|
| Green Strength, Modulus @ 100% PSI | 37.70 | 41.91 | 44.52 | 52.20 | 49.30 | 56.26 | 104.69 | 87.29 | 48.00 | 57.13 | 64.09 | 86.42 | 52.93 | 59.60 | 82.65 | 61.34 |
| Time to Decay 75% from strain end point min. | 1.39 | 1.58 | 2.06 | 2.95 | 3.21 | 3.55 | 70.15 | >5 min. | 2.46 | 2.93 | 4.42 | 11.93 | 3.08 | 3.61 | 8.63 | 4.09 |
| Die B Tear Resistance-N/mm | 60.70 | 62.50 | 60.82 | 71.00 | 70.64 | 70.28 | 76.05 | 84.18 | 66.50 | 70.18 | 74.16 | 86.90 | 68.16 | 71.34 | 75.40 | 70.03 |
| Aged Die B Tear Resistance-N/mm | 57.93 | 57.02 | 56.84 | 53.23 | 72.86 | 71.52 | 79.24 | 77.52 | 68.91 | 69.33 | 76.10 | 82.22 | 66.98 | 71.54 | 82.59 | 71.30 |
| Die C Tear Resistance-N/mm | 35.00 | 37.02 | 33.25 | 35.49 | 39.67 | 38.66 | 41.30 | 35.52 | 37.36 | 39.78 | 38.53 | 40.84 | 36.93 | 41.95 | 37.64 | 39.90 |
| Aged Die C Tear | 30.48 | 29.92 | 29.01 | 29.72 | 36.14 | 36.97 | 36.73 | 36.90 | 32.82 | 34.48 | 40.58 | 38.55 | 33.76 | 35.20 | 39.77 | 34.54 |

TABLE 15B-continued

| | Properties of Compositions 29-44 | | | | | | | | | | | | | | | |
|---|---|---|---|---|---|---|---|---|---|---|---|---|---|---|---|---|
| Property | 29 | 30 | 31 | 32 | 33 | 34 | 35 | 36 | 37 | 38 | 39 | 40 | 41 | 42 | 43 | 44 |
| Resistance-N/mm | | | | | | | | | | | | | | | | |
| Air Permeability 65° C. −1, cm³-cm/cm²-sec-atm (×10⁸) | 2.04 | 1.59 | 1.68 | 1.42 | 1.75 | 1.43 | 1.55 | 1.45 | 1.67 | 1.53 | 1.65 | 1.21 | 1.74 | 1.35 | 1.32 | 1.53 |
| Air Permeability 65° C. −2, cm³-cm/cm²-sec-atm (×10⁸) | 1.91 | 1.54 | 1.64 | 1.43 | 1.84 | 1.46 | 1.59 | 1.48 | 1.52 | 1.69 | 1.62 | 1.18 | 1.54 | 1.30 | 1.23 | 1.78 |
| Average | 1.98 | 1.57 | 1.66 | 1.43 | 1.80 | 1.45 | 1.57 | 1.47 | 1.60 | 1.61 | 1.64 | 1.20 | 1.64 | 1.33 | 1.28 | 1.66 |

We claim:

1. An elastomer nanocomposite composition comprising:
   a matrix of at least one elastomer component comprising a random copolymer comprising a $C_4$ to $C_7$ isomonoolefin derived unit as a continuous phase;
   carbon black as a dispersed phase;
   at least one exfoliated clay as a dispersed phase; and
   polybutene oil having a number average molecular weight greater than 400.

2. The composition of claim 1, wherein the composition is a nanocomposite including an exfoliated clay selected from the group consisting of exfoliated natural or synthetic montmorillonite, nontronite, beidellite, volkonskoite, laponite, hectorite, saponite, sauconite, magadite, kenyaite, stevensite, vermiculite, halloysite, aluminate oxides, hydrotalcite, and mixtures thereof, and wherein the composition also comprises a thermoplastic resin containing nitrogen, oxygen, halogen, sulfur or another group capable of interacting with aromatic functional groups in the poly(isobutylene-co-p-methylstyrene).

3. The composition of claim 1, wherein the copolymer is selected from the group consisting of a halogenated poly(isobutylene-co-p-methylstyrene), halogenated star-branched butyl rubber, halogenated butyl rubber, and mixtures thereof.

4. The composition of claim 1, further comprising a thermoplastic resin selected from the group consisting of polyamides, polyimides, polycarbonates, polyesters, polysulfones, polylactones, polyacetals, acrylonitrile-butadiene-styrene resins (ABS), polyphenyleneoxides (PPO), polyphenylene sulfides (PPS), polystyrenes, styrene-acrylonitrile resins (SAN), styrene maleic anhydride resins (SMA), aromatic polyketones (PEEK, PED, and PEKK), and combinations thereof.

5. The composition of claim 1, wherein the polybutene oil has a molecular weight of less than 10,000.

6. The composition of claim 1, wherein the polybutene oil is present from 2 to 40 phr.

7. The composition of claim 1, further comprising a filler selected from the group consisting of calcium carbonate, clay, mica, silica and silicates, talc, titanium dioxide, starch, wood flour, and mixtures thereof.

8. The composition of claim 1, wherein the exfoliated clay is selected from the group consisting of exfoliated natural or synthetic montmorillonite, nontronite, beidellite, volkonskoite, laponite, hectorite, saponite, sauconite, magadite, kenyaite, stevensite, vermiculite, halloysite, aluminate oxides, hydrotalcite, and mixtures thereof.

9. The composition of claim 1, wherein the polybutene oil has a viscosity of from 10 to 6000 cSt at 100° C.

10. The composition of claim 1, wherein the polybutene oil has a viscosity of from 35 to 5000 cSt at 100° C.

11. The composition of claim 1, wherein naphthenic oil is substantially absent.

12. The composition of claim 1, wherein the unaged fatigue-to-failure value of the composition is greater than 70,000 units.

13. An elastomer composition comprising:
    a continuous phase of at least one vulcanized elastomer component comprised of a random copolymer comprising a $C_4$ to $C_7$ isomonoolefin derived unit,
    at least one filler dispersed therein,
    at least one exfoliated clay as a dispersed phase; and
    polybutene processing oil having a number average molecular weight of from 400 to 10,000.

14. The composition of claim 13, wherein the polybutene has a viscosity of from 10 to 6000 cSt at 100° C.

15. The composition of claim 13, wherein the polybutene is present from 2 to 30 phr.

16. The composition of claim 13, wherein naphthenic oil is substantially absent.

17. The composition of claim 13, wherein the elastomer is a copolymer of a $C_4$ to $C_7$ isoolefin and a p-methylstyrene derived units.

18. The composition of claim 13, wherein the elastomer is halogenated.

19. The composition of claim 13, wherein the filler is carbon black.

* * * * *